United States Patent
Smith

(10) Patent No.: US 6,662,172 B1
(45) Date of Patent: Dec. 9, 2003

(54) INTELLIGENT BUSINESS RULES MODULE

(75) Inventor: Yvonna J. Smith, Austin, TX (US)

(73) Assignee: Cook-Hurlbert, Inc., Austin, TX (US)

( * ) Notice: Subject to any disclaimer, the term of this patent is extended or adjusted under 35 U.S.C. 154(b) by 515 days.

(21) Appl. No.: 09/707,358

(22) Filed: Nov. 7, 2000

(51) Int. Cl.$^7$ ............... G06F 15/00; G06F 17/30
(52) U.S. Cl. ............... 706/47; 706/60; 345/581; 345/764
(58) Field of Search ............... 345/581, 661, 345/676, 700, 764, 810, 841; 706/45–47, 59, 60; 707/1, 100, 103 R, 103 Y

(56) References Cited

U.S. PATENT DOCUMENTS 5,293,479 A * 3/1994 Quintero et al. ............ 395/161
6,564,201 B1 * 5/2003 Hamsa ............ 707/1

* cited by examiner

*Primary Examiner*—Paul P. Gordon
(74) *Attorney, Agent, or Firm*—Campbell Stephenson Ascolese, LLP; D'Ann Naylor Rifai

(57) ABSTRACT

An intelligent business rules module and method for processing an action to be performed on a design. The action includes adding a feature, changing a value of an attribute of a feature, removing a feature, and moving a feature from an old work location in the design to a new work location in the design. The intelligent business rules module includes instructions for determining a type of the action, determining the feature type of the feature that is the subject of the action, and determining whether a business rule exists for performing the action type on the feature type. If a business rule exists, the business rules module determines whether performing the action on the feature will satisfy the business rule. If performing the action will satisfy the business rule, the intelligent business rules module approves the action to be performed on the design.

21 Claims, 24 Drawing Sheets

*Evaluate Action*

*Evaluate Add Feature*

*Evaluate Change Attribute Value*

*Evalute Remove Feature*

Evaluate Move Feature

Specify Activities

Specify Add Feature

Specify Change
Attribute Value

Specify Remove Feature

*Move Feature*

Object Model

INTELLIGENT BUSINESS RULES MODULE

CROSS-REFERENCE TO RELATED APPLICATIONS

This application relates to application Ser. No. 09/558,123, filed on Apr. 25, 2000, entitled "Expert Designer System Virtual Plug-In Interface" and naming Michael B. Hamsa as inventor, the application being incorporated herein by reference in its entirety now U.S. Pat. No. 6,564,201 issued May 13, 2003.

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

The present invention relates to expert designer systems, and more particularly to an intelligent business rules module for expert designer systems in the utility industry.

2. Description of the Related Art

Expert designer systems allow a user to design a physical facility on the computer and to analyze the resulting computerized model of the facility to enhance or change the design. As described herein, a facility is made up of features which represent physical objects such as transformers and telephone poles. A feature may be a compound feature containing other features as components; for example, a switchbox contains multiple switches and cutouts, each switch and cutout itself being a feature. A facility is designed for a particular work location, defined by physical boundaries of the land.

Expert designer systems automate developing, planning, modeling, and managing large facilities. A design is viewed as a work location having a set of features. A designer working with the design requests actions on features, such as moving a feature within the design. While the action may be performed at the component level rather than at the feature level, conceptually the action may be envisioned as operating at the feature level.

In the utility industry, expert designer systems are used to manage, for example, gas distribution utility systems and electric utility distribution systems. Expert designer systems often access and make use of geographic information systems (GIS) information. Geographic information systems provide spatial information describing existing land and facilities to be incorporated into proposed designs. For example, an expert designer system may be used to design facilities in coordination with a variety of sources of geographic information, such as Automated Mapping and Facilities Management (AM/FM), Geographic Information Systems (GIS), Supervisory Control and Data Acquisition (SCADA), and related information technologies for utilities, government agencies, and other organizations concerned with land records and facilities management. These geographic information sources will be referred to collectively herein as "geographic information systems," or "GISs."

It is known to provide an expert designer system for use with geographic information systems. One example of such a system is available from Cook-Hurlbert, Inc. under the trade designation CH-Expert Designer, v. 2.0. FIG. 1, labeled prior art, shows a block diagram of such an expert designer system for use with geographic information systems. The expert designer system of FIG. 1 includes an expert designer 102 and an expert designer database 108. Expert designer 102 is coupled to a GIS core 104. The GIS core 104 is coupled to a GIS database 106. In operation, a user accesses the expert designer system 102, which interacts with the GIS core 104 to obtain information from the GIS database 106.

The expert designer 102 also integrates GIS with work management applications (not shown), offering a standard, cost-effective way to close the loop between design and mapping. Expert designer 102 allows GIS-based spatial information describing existing land and facilities to be incorporated into proposed designs.

Business rules of an expert designer system express allowed and required connectivity, the propagation of attributes such as phase and voltage, and constraints on attribute values for components of a design. Business rules provide intelligence about how GIS-based spatial information affects the design, how features of the design may be connected, relationships that are required and/or allowed between features of the design, and other similar information.

Most expert designer systems that use business rules are written specifically for a particular GIS and data model for a design. Furthermore, many systems using business rules use an inference engine to apply the business rules, which may use forward- and/or backward-chaining through the business rules to analyze the design. Because of the need to forward- and/or backward-chain through the business rules, inference engines often operate too slowly to be used in dynamically evaluating a design as changes are being made.

The CH-Expert Designer 2.0 system also includes a quality analysis tool that allows companies to analyze a design and verify connectivity of features, placement, and attribute values in a network or an entire GIS. The quality analysis tool allows users to verify that the data meet very high quality standards and to identify recurring problems. However, most quality analysis tools operate after a design is built using an inference engine and do not dynamically evaluate each change to the design as the change is being made.

To more effectively assist designers with preparing designs, a business rules module is desirable that dynamically evaluates additions, changes, and removals from the design as they are being performed. Placement into a design is highly time-sensitive, and the quality analysis tool should operate without noticeable delays to the designer using the expert designer system. To be the most useful, the business rules module should operate independently of the data model for the design so that it can be used with different types of designs and a variety of GIS systems.

SUMMARY OF THE INVENTION

In accordance with the present invention, an intelligent business rules module and method for processing an action to be performed on a design is presented.

In at least one embodiment of the invention, the action to be performed includes adding a feature to the design; changing a value of an attribute of a feature of the design; removing a feature from the design; and moving a feature from an old work location in the design to a new work location in the design.

In at least one embodiment, the intelligent business rules module includes instructions for determining a type of the action, determining the feature type of the feature that is the subject of the action, and determining whether a business rule exists for performing the action type on the feature type. If a business rule exists, the business rules module determines whether performing the action on the feature will satisfy the business rule. If performing the action will satisfy the business rule, the intelligent business rules module approves the action to be performed on the design. If performing the action will not satisfy the business rule, the business rules module does not approve the action to be performed.

In one embodiment, the intelligent business rules module includes at least one business rule and a business rules core. The business rules core receives the request for the action, dynamically and immediately evaluates the action prior to the performance of the action, approves the action, and specifies at least one activity to be performed in response to the request.

In another embodiment, the intelligent business rules module may be included as part of an expert designer system. The expert designer system includes an expert designer system core which includes the intelligent business rules module. If the intelligent business rules module approves the action to be performed on the design, the expert designer system core performs the action on the design.

In yet another embodiment, the expert designer system incorporating the business rules module may also include a virtual plug-in interface that enables the expert designer system to seamlessly integrate with multiple types of database systems, including geographic information systems and work management systems.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
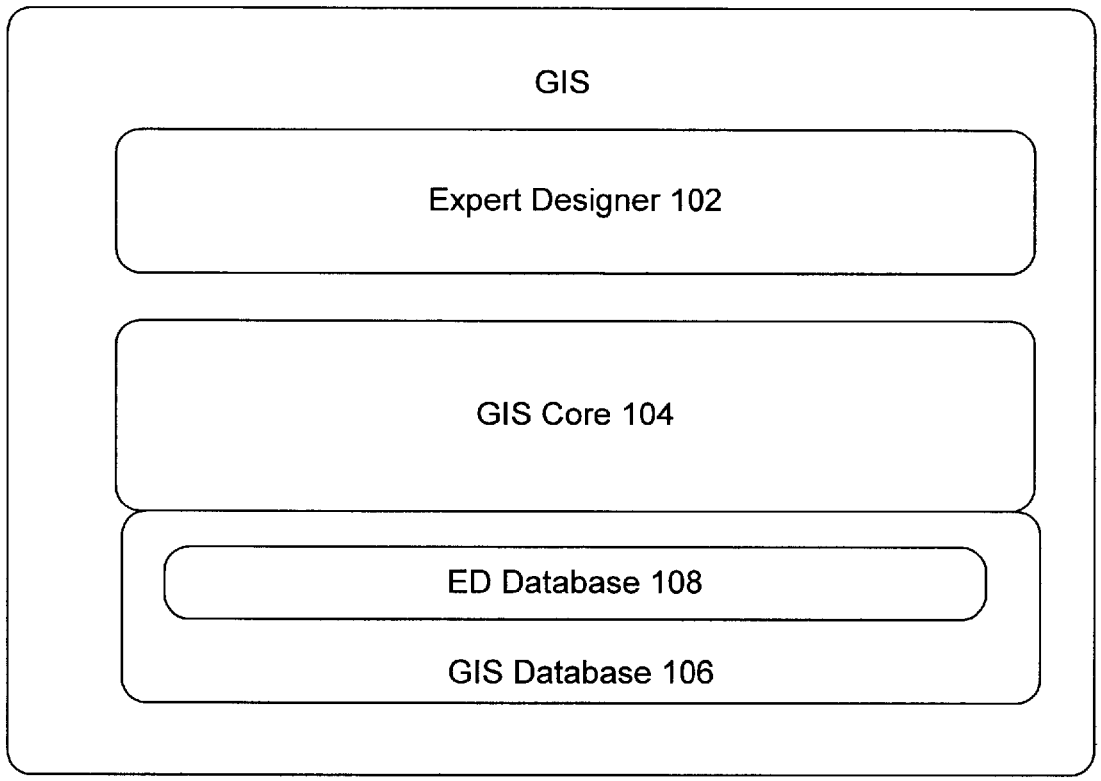
FIG. 1 shows a block diagram of a prior art expert designer system and a geographic information system.
Figure 2:
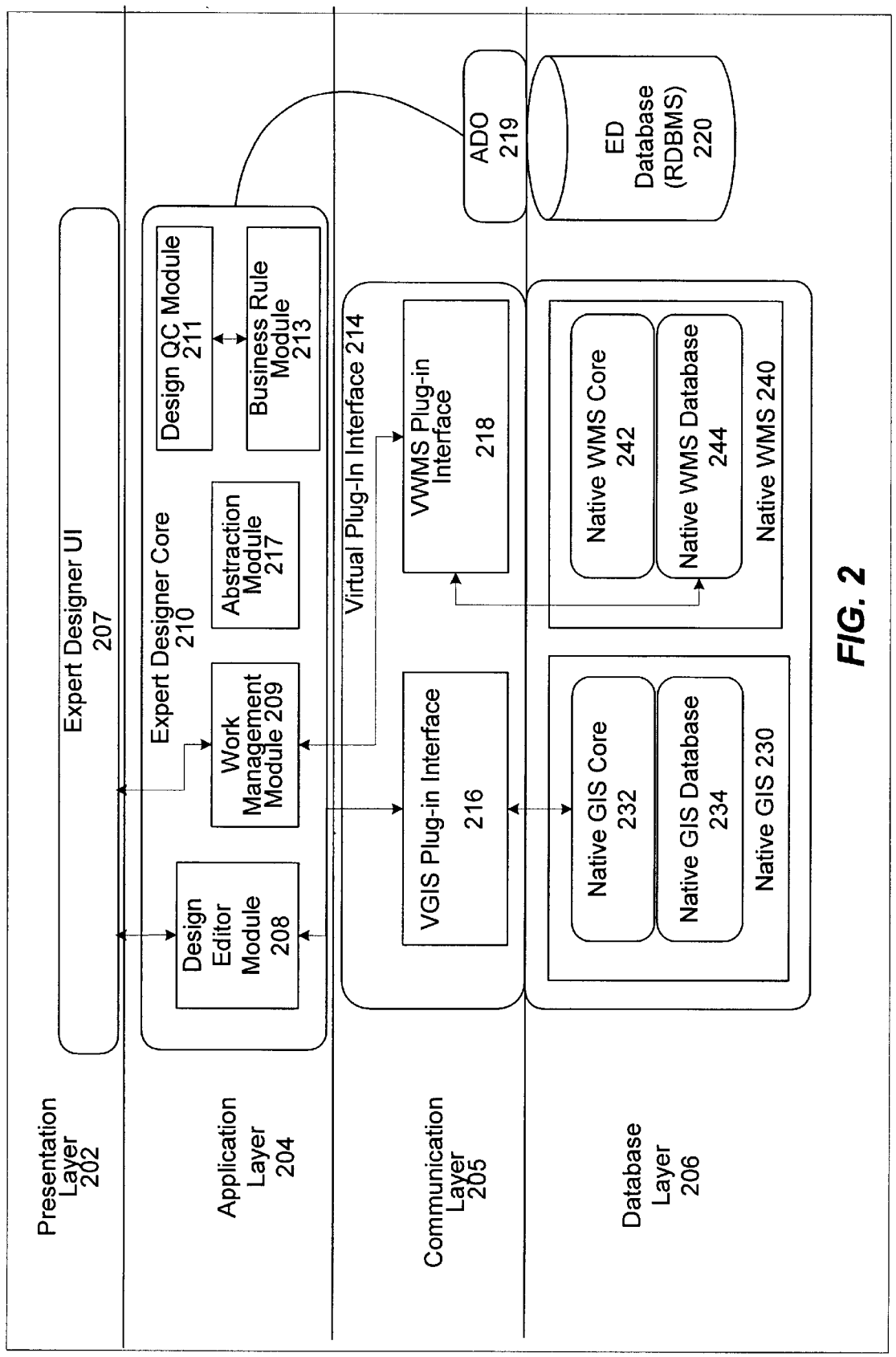
FIG. 2 shows a block diagram of an expert designer system in accordance with the present invention, a geographic information system, and a work management system.

FIG. 2 shows a block diagram of an expert designer system 200 and a geographic information system and a work management system with which the expert designer system interacts. Expert designer system 200 includes expert designer user interface 207, expert designer core 210, ADO (ActiveX Data Objects) 219, and ED Database (RDBMS) 220. The expert designer system 200 includes a presentation layer 202, an application layer 204, a communications layer 205, and a database layer 206. Presentation layer 202 includes an expert designer user interface 207.

Application layer 204 includes an expert designer core 210 which includes a business rules module 213 and at least other one module such as design editor module 208, work management module 209, and design QC module 211.

Communications layer 205 includes a virtual plug-in interface 214 and ActiveX Data Objects (ADO) 219. Virtual plug-in interface 214 includes a virtual geographic information system (GIS) interface 216 and a virtual work management system (WMS) interface 218. Design editor module 208 makes all calls to virtual GIS plug-in interface 216 and work management module 209 makes all calls to virtual WMS plug-in interface 218.

Database layer 206 includes an expert designer system (ED) database 220 for storing persistent data for the expert designer system 200. ED database 220 is preferably implemented using a relational database management system, although databases implemented using non-relational database management systems are also within the scope of the invention. Also shown at the database layer 206 level, although not a part of the expert designer system 200, are two types of database systems with which the expert designer system 200 is designed to interact: a native geographic information system (GIS) 230, including a native GIS core 232 and a native GIS database 234, and a native work management system (WMS) 240, including a native WMS core 242 and a native WMS database 244.

In operation, the expert designer user interface 207 interacts with the expert designer core 210. The expert designer core 210 is coupled to the database layer 206 via the virtual plug-in interface 214. The expert designer core 210 is also coupled to the ED database 220 via ADO 219.

The expert designer core 210 performs a plurality of functions. More specifically, the expert designer core 210 exposes common data to the expert designer user interface 207, interacts with the virtual plug-in interface 214, abstracts features in the GIS and/or WMS, uses the business rules module to apply business rules to a design, and performs expert designer core logic functions.

Examples of common data which may be shared between the expert designer system 200, the GIS, and the WMS include designs, work requests, work locations, work location facilities, compatible units, material items, cost, and associated labor. A compatible unit is a standardized specification of labor and material including material items. For example, in an embodiment for a gas distribution facility, the three systems share information about the design of the gas distribution facility, work requests for changes to the gas distribution facility, the work location of the gas distribution facility, any components of the gas distribution facility already in place at the work location, compatible units, and material items.

The expert designer system 200 uses a metamodel to represent data, rather than being written specifically for a particular data model. For example, a feature type abstraction is used to represent a variety of feature types such as electrical poles, electrical lines, transformers, and so on. When abstracting features in the GIS, expert designer core 210 may use configurable abstraction modules 217 to abstract the shape of tables in the GIS, store database relationship information or contain attribute defaults for feature creation.

The expert designer core 210 also includes a design QC module 211 and a business rules module 213. Business rules module 213 defines business rules for placement of a feature in a design, connecting a first feature to a second feature, validating a value of an attribute of a feature, and propagating values of an attribute from one feature to another feature. More specifically, the business rules handle attribute dependencies, manage aggregation of components into features, and restrict incorrect feature placement. Business rules module 213 operates dynamically while the design is being built or modified to ensure that the resulting design meets the quality standards embodied in the business rules. Design QC module 211 is used statically to ensure that an existing design meets quality standards for feature connectivity and attributes.

Figure 3:
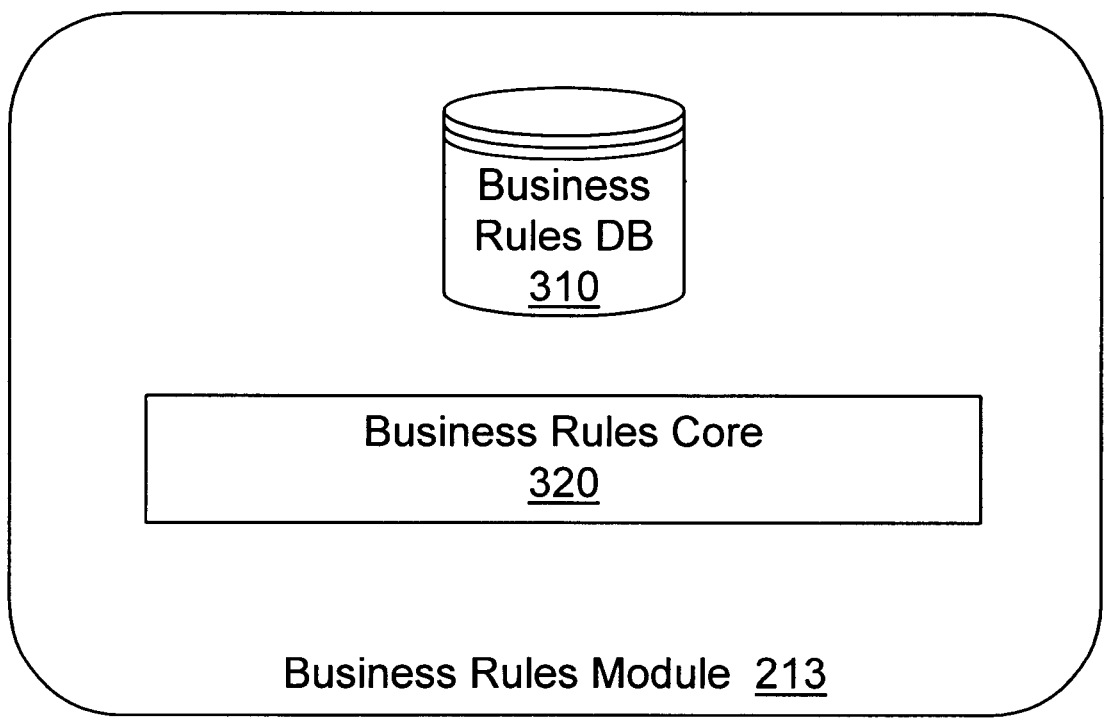
FIG. 3 shows a block diagram of the business rules module of the present invention.

FIG. 3 shows the elements of business rules module 213. Business rules module 213 includes business rules database 310 that has at least one business rule specifying a quality standard that must be met in a quality design. Business rules database 310 is part of ED database 220 of FIG. 2 but is shown as being part of the business module for illustration purposes. Business rules core 320 includes logic for applying the business rules to a design. The business rules and business rules core 320 use the abstractions of the metamodel to operate independently of a particular data model. Business rules database 310 is configurable by adding or changing rules to enforce quality standards.

To the extent possible, business rules should be distinguished by direction of data flow. For example, the fact that two electrical lines connected by a cutout must have the same phase and voltage should be expressed only once, rather than once for each electrical line. The same business rule should support rejecting the connection of electrical lines with different voltage. Similarly, the same business rule should support propagating a voltage from one electrical line to a second voltage where voltage is not yet assigned.

A user of the expert designer system 200 uses expert designer user interface 207 to prepare a design and/or change an existing design. FIGS. 4–11 show an example of a design session using an expert designer system incorporating the business rules module of the present invention.

Figure 4:
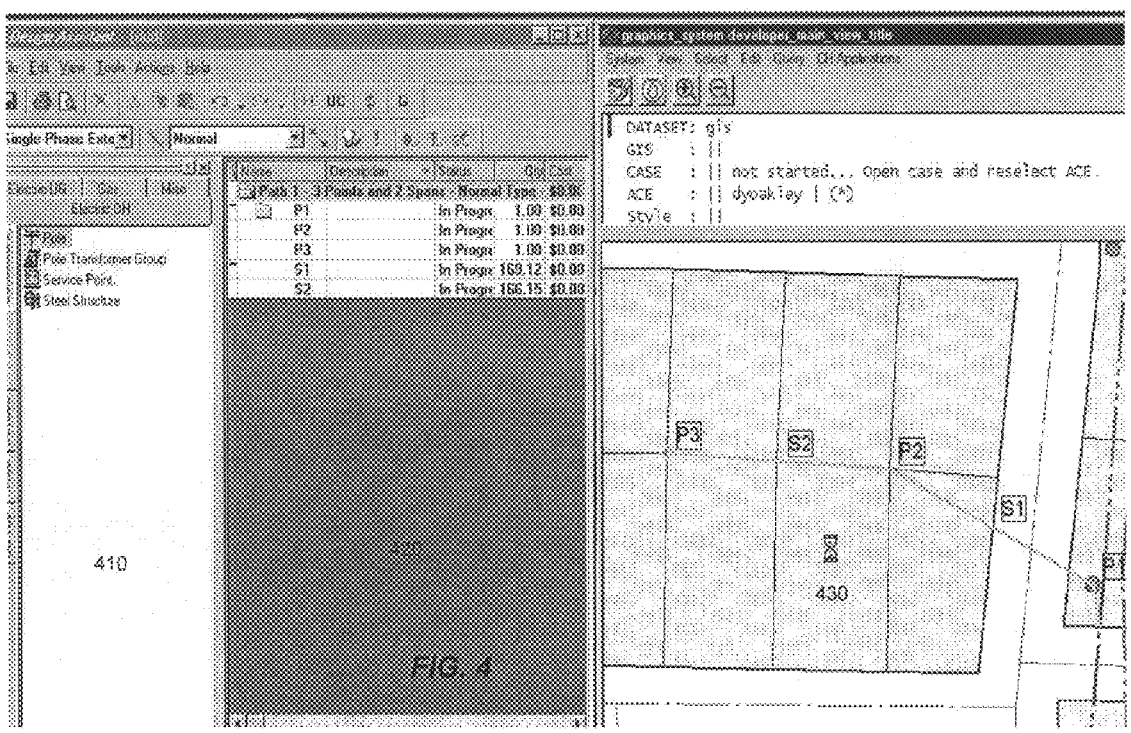
FIGS. 4–11 show an example of a design session using an expert designer system incorporating the business rules module of the present invention.

FIG. 4 shows an example of the expert designer user interface 207. The expert designer user interface 207 includes a catalog window 410 from which to select features, a workspace window 420 showing the existing design, and a map window 430 showing the design superimposed on the map. Map window 430 shows the work locations for the features of the design.

Catalog window 410 shows that the user is viewing an electrical overhead design. The electrical overhead design includes 3 points (P1, P2, and P3) and 2 spans (S1 and S2) as shown in workspace window 420. The corresponding map for the electrical overhead display is shown in map window 430. A primary electrical line passing through point P1 and a telephone pole at point P1 exist as part of another installation. The user is developing a new design that will incorporate the existing primary line and telephone pole at P1.

Figure 5:
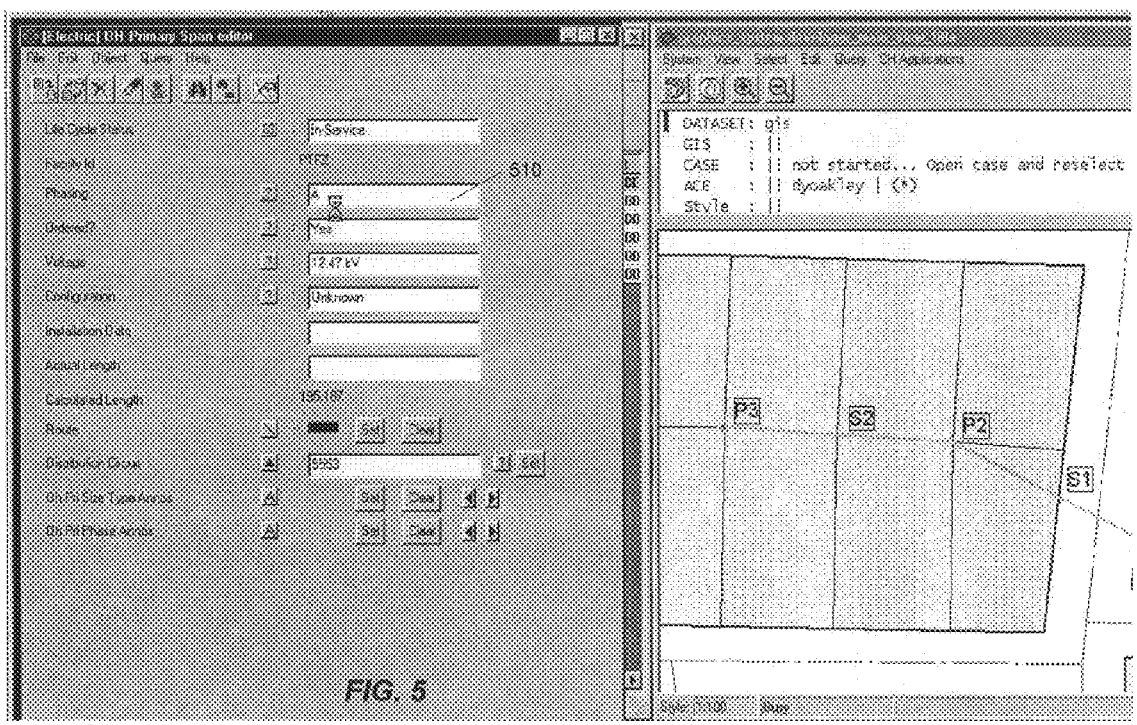

In FIG. 5, the primary span editor is used to show that the phasing field 510 for the existing primary electrical line passing through point P1 has a phase value of A.

Figure 6:
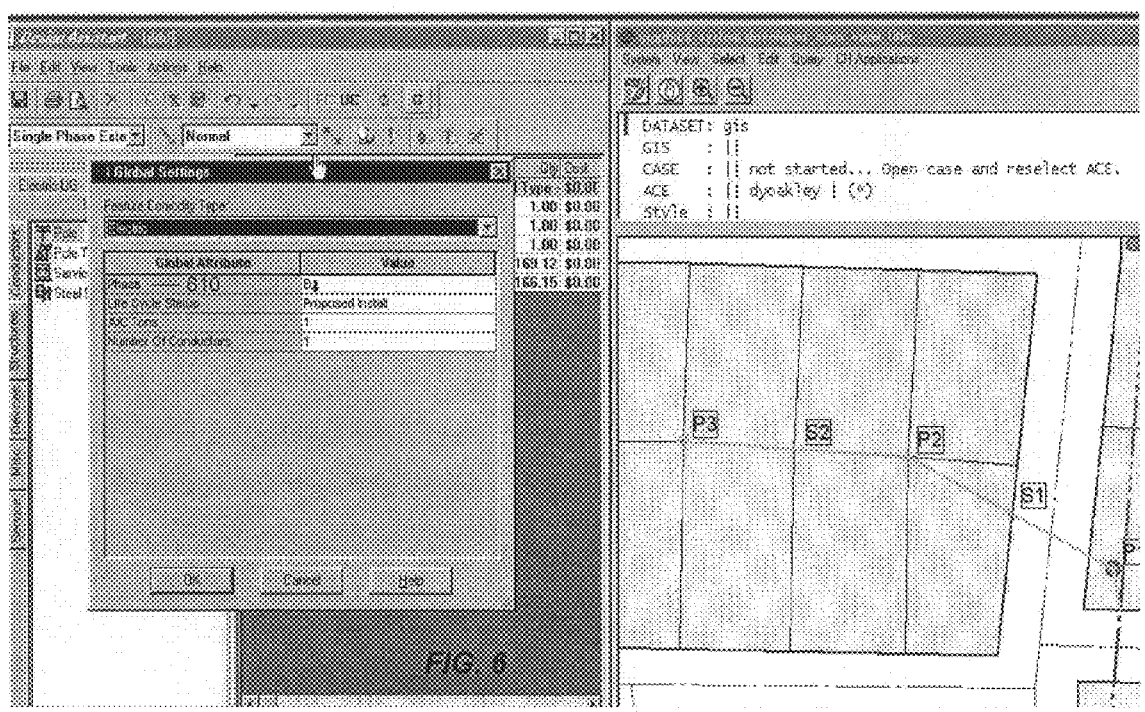

FIG. 6 shows global settings for electrical lines of the design. The default phase value for electrical lines of the design is shown in phase field 610 and has a phase value of B. Any electrical line to be added to the design will have a phase value of B unless this global setting is overridden.

Figure 7:
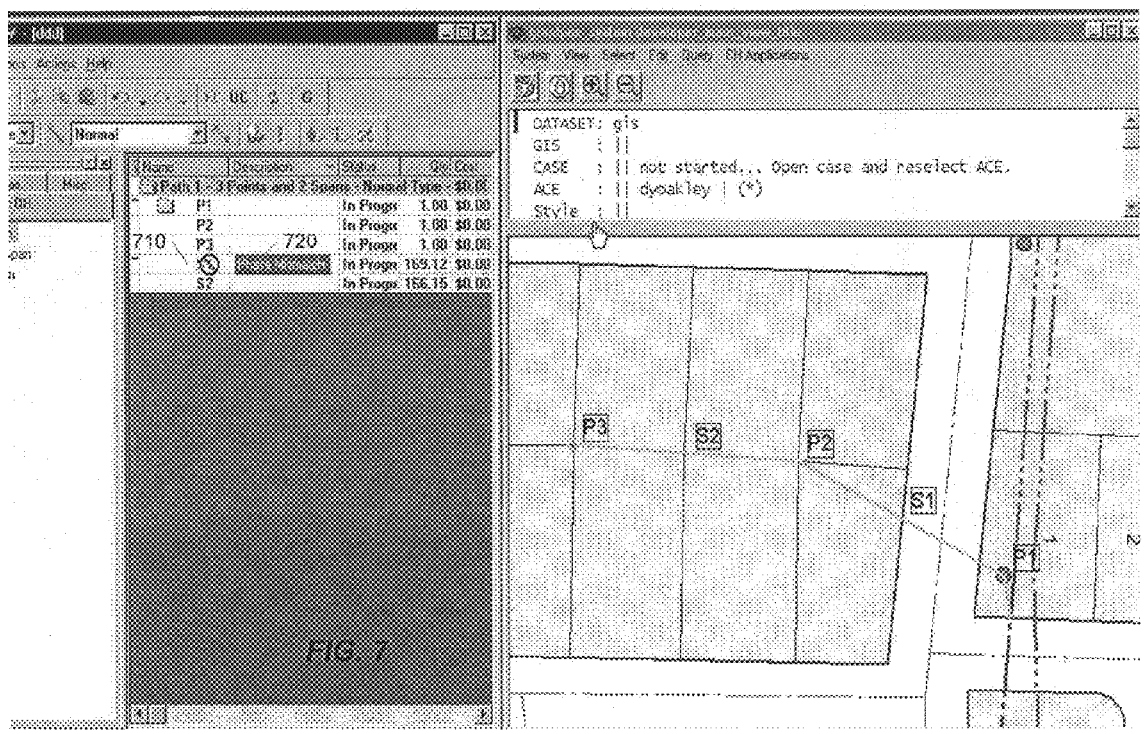

FIG. 7 shows that the user has attempted to add a new primary electrical line (with the default phase value of B) at S1 (between points P1 and P2) by dragging the primary electrical line onto the S1 span 710 in the design. Business rules module 213 has produced a phase mismatch error 720 because the phase values for the new primary electrical line to be added and the existing primary electrical line are not compatible. The new primary electrical line is not added to the design.

Figure 8:
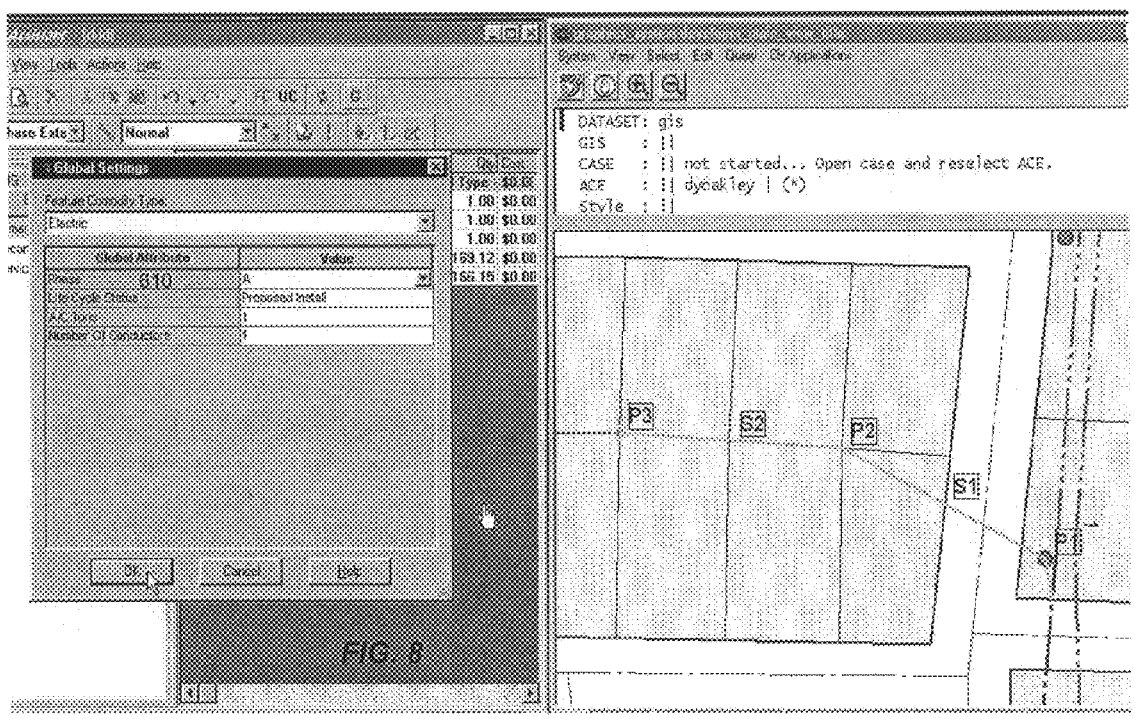

FIG. 8 shows that the user has changed the global settings for electrical lines in the design to have a phase value of A. The user again tries to add a new primary line at span S1.

Figure 9:
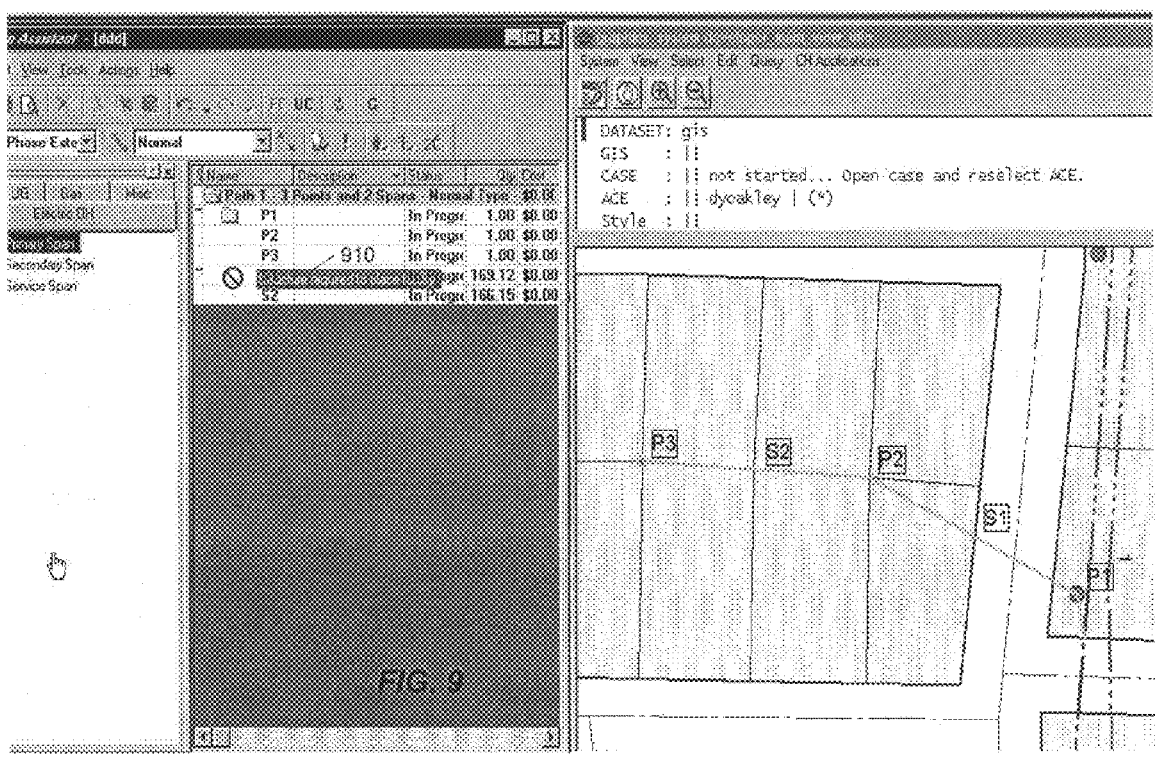

FIG. 9 shows the resulting error message 910 indicating that a structure is required to place the electrical line. The user adds a telephone pole to support the electrical line.

Figure 10:
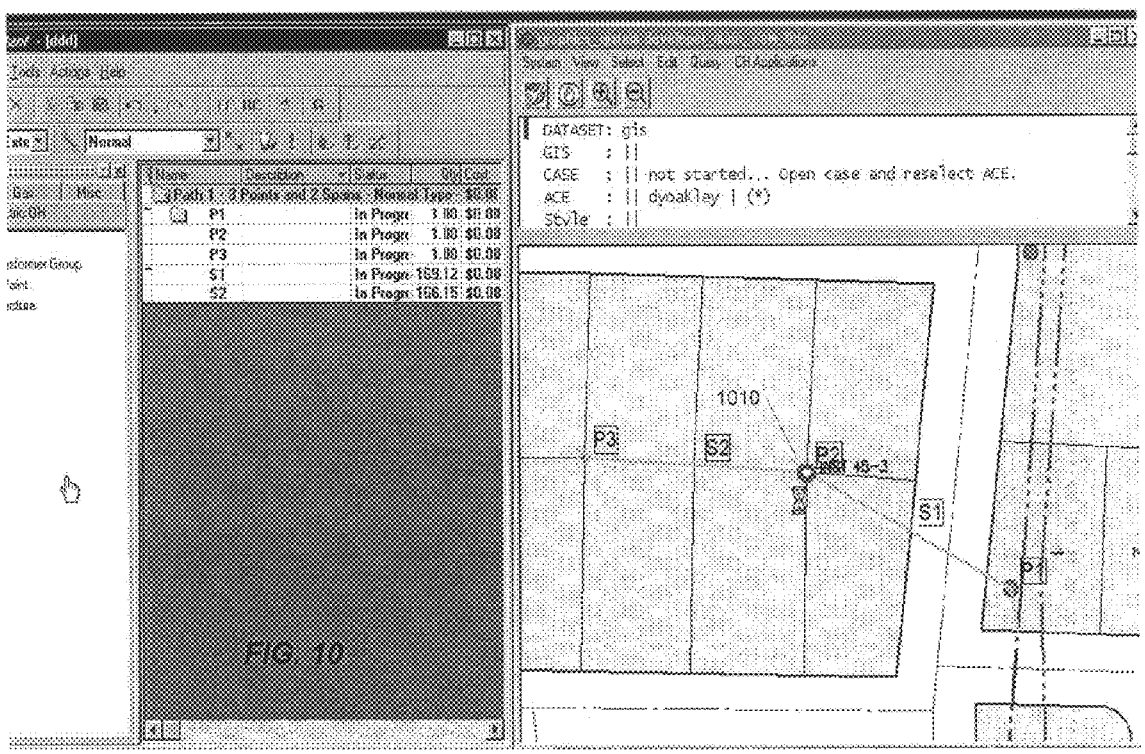

FIG. 10 shows the map after the user has successfully added a telephone pole 1010 at point P2. The user then successfully drags and drops the new primary telephone line at S1.

Figure 11:
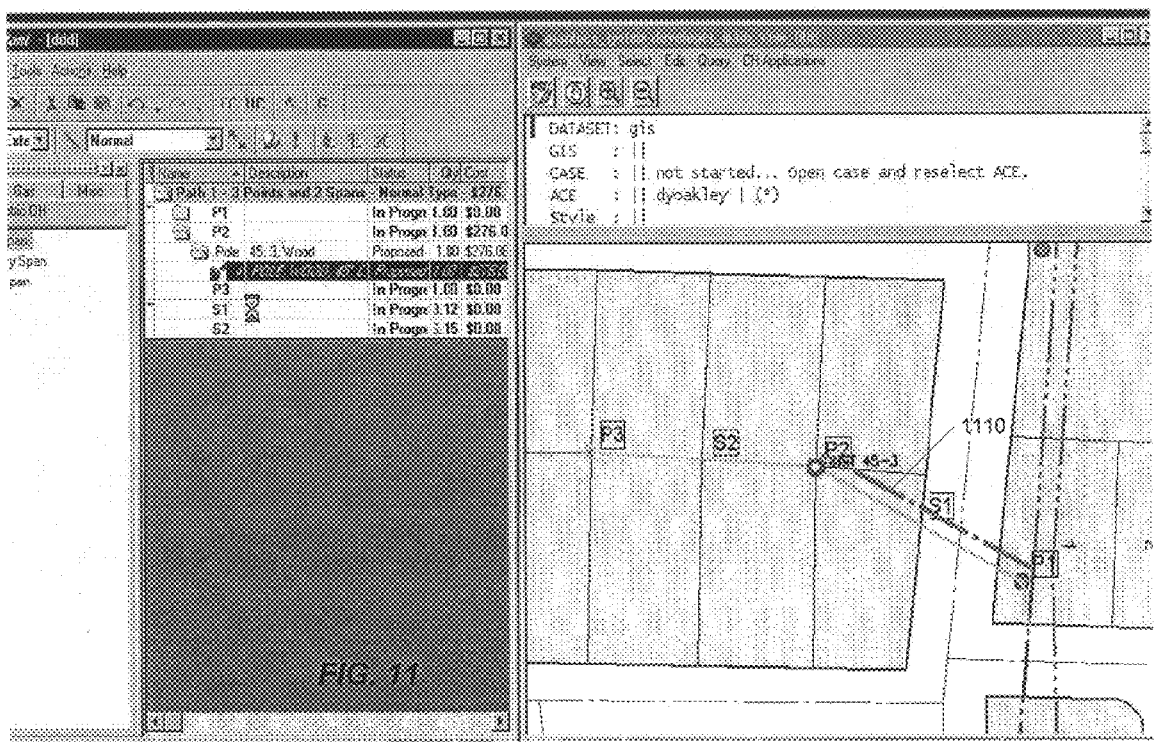

FIG. 11 shows the design with the new telephone pole and primary line. Window 420 includes the new pole and map window 430 shows the telephone pole at point P2 and the new primary line between points P1 and P2.

Figure 12:
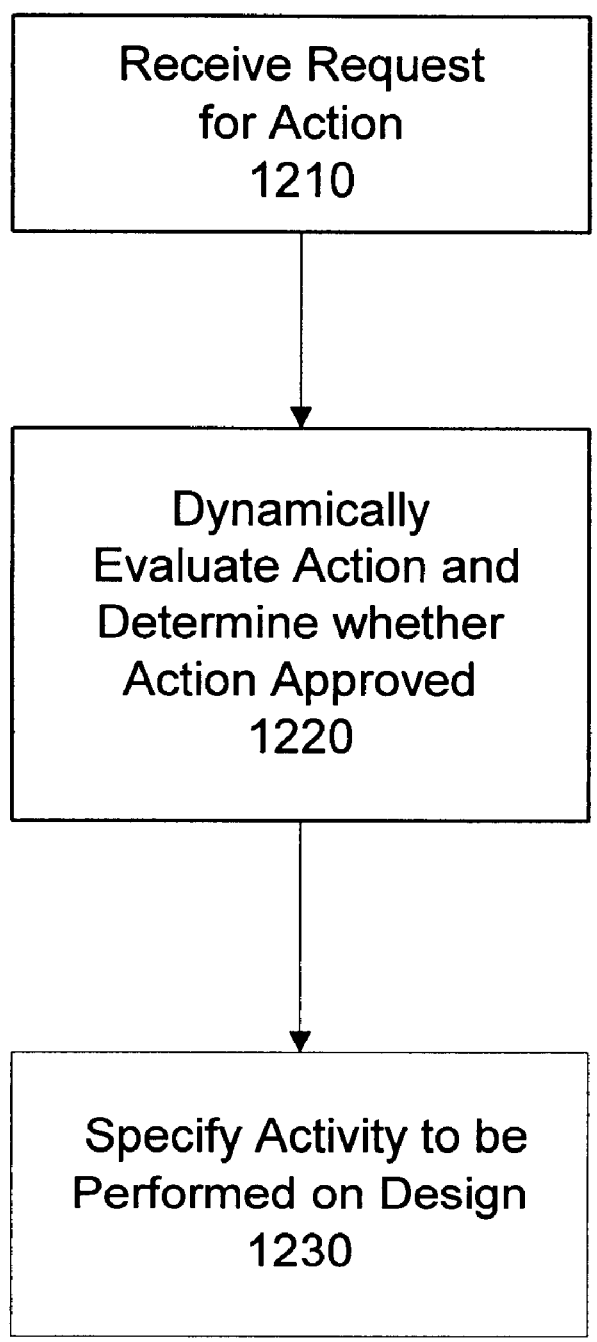
FIG. 12 shows a flowchart of the operation of the business rules module of FIG. 3.

FIG. 12 shows an flowchart providing an overview of the operation of business rules module 213. Business rules core 320 processes a request for an action to be performed on a design. The types of actions that can be requested include adding a feature to the design, changing a value of an attribute of a feature of the design, removing a feature from the design, and moving a feature from an old work location in the design to a new work location in the design. Adding a feature is requested by dragging and dropping a feature from a catalog onto a design. Changing a value of an attribute of a feature of the design is requested by entering the new value in the attribute field. Removing a feature from a design is requested by selecting the feature and, for example, pressing a delete key. Moving a feature is requested by dragging the feature from the old work location on the map to the new work location on the map.

In step 1210 of FIG. 12, business rules core receives the request for an action to be performed on the design. The request is received from the user via the expert designer user interface 207. In response to the request, in step 1220 business rules core 320 dynamically evaluates the design and determines whether to approve the action. Business rules core 320 immediately selects at least one business rule for evaluating the effect of the action on the design. Based upon this evaluation, business rules core 320 either approves the action or does not approve the action. The evaluation and approval is done dynamically, prior to the performance of the action. When more than one business rule is used, each rule must be satisfied for the action to be approved.

The selection of the at least one business rule is done immediately rather than forward- or backward-chaining through a rules database to determine the applicable rules, as is done by inference engines. Business rules core 320 assesses the request for the action and uses the action type and feature type(s) to directly find the business rules to be used to evaluate the action. The business rule to be used is found without chaining through the business rules. The action is evaluated and performed immediately so that the minimal processing delays do not noticeably affect the work of the designer.

In response to the evaluation of the action, in step 1230, business rules core 320 specifies at least one activity to be performed in response to the request for the action. If the action is approved, the business rules core 320 specifies that the action be performed in addition to other activities that are a consequence of the action. For example, if a new feature is added to the design, business rules module 320 also specifies activities to add relationships from the new feature to existing features, to propagate attribute values, and so on. In the embodiment of an expert designer system shown in FIG. 2, designer editor module 208 performs the activities on the design. If the action is not approved, the business rules core 320 specifies providing a message to the designer indicating that the action will not be performed and giving reasons why the action was not approved.

Figure 13:
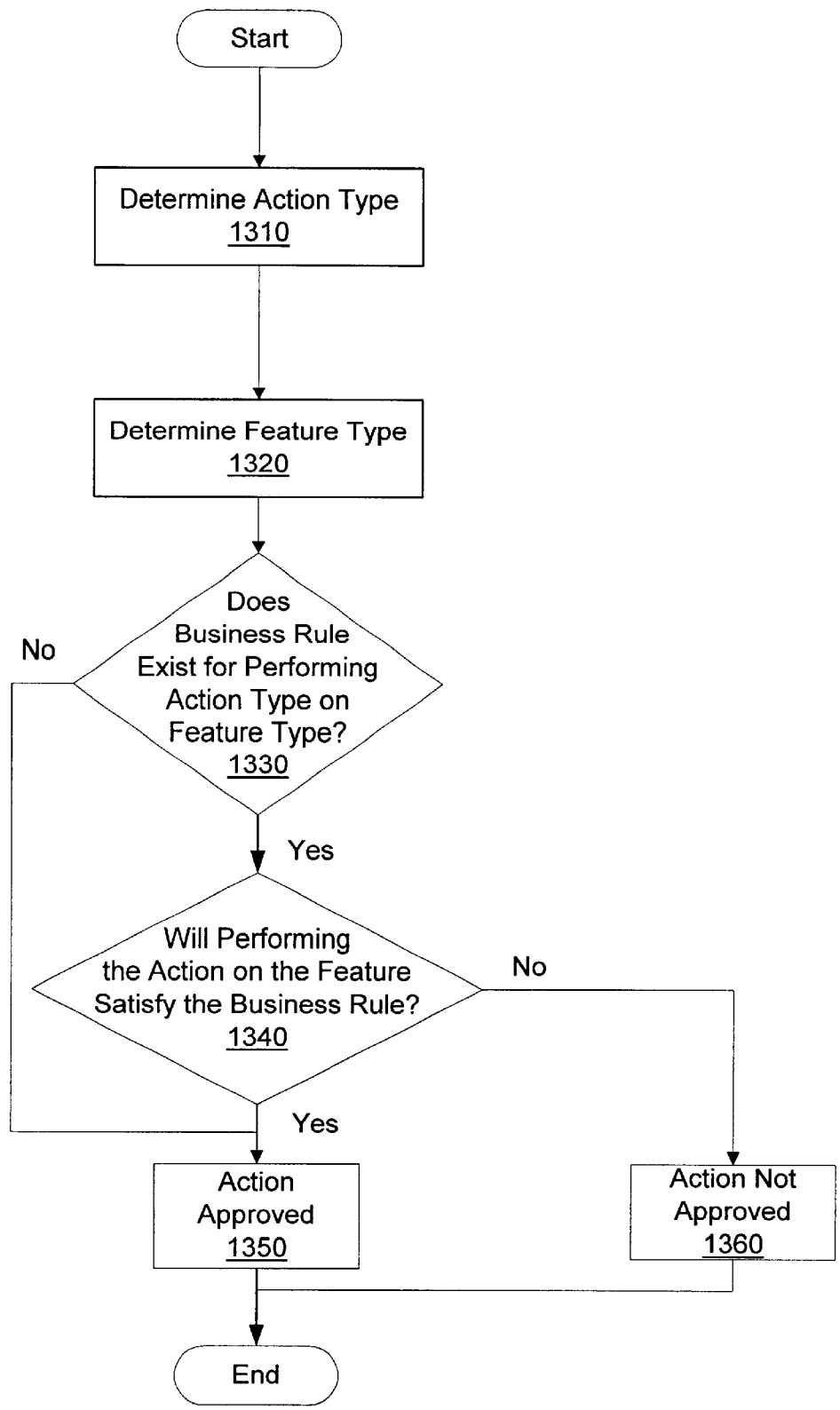
FIG. 13 shows a flowchart of the Dynamically Evaluate Action and Determine whether to Approve Action step of FIG. 12.

FIG. 13 shows a detailed flowchart of the Dynamically Evaluate Action and Determine whether to Approve Action step 1220 of FIG. 12. Business rules core 320 determines the action type in step 1310 and the feature type in step 1320. In step 1330, business rules core 320 determines whether a business rule exists for performing the action type on the feature type. If no business rule exists, the action is not approved in step 1360. If a business rule exists, step 1340 determines whether performing the action on the feature will satisfy the business rule. If the business rule will be satisfied, the action is approved in step 1350. If the business rule will not be satisfied, the action is not approved in step 1360.

A business rule may be one of several different types. For example, a feature relationship rule indicates a relationship between a first feature type and a second feature type. In the electrical field, for example, a feature type may have a structural relationship to another feature type, such as a transformer may be structurally attached to a pole. Also, in the electrical field, flow connectivity relationships are important. For example, a transformer can make two flow connections, one to a primary electrical and another to a secondary electrical line. A flow connection rule expresses a number of different connections that can be made.

To satisfy a feature relationship rule, the action to be performed must involve two features, one of the first feature type and another of the second feature type. If the two features involved in the action are of the proper feature types, the rule is satisfied.

Another type of business rule is an attribute value relationship rule. An attribute value relationship rule has two attributes and an operator. The operator indicates the type of relationship that must exist between the values of the two attributes to satisfy the rule. For example, an electrical line with phase ABC can be connected only to conductors that are of phase A, B or C. The business rule expresses that the phase attribute of a conductor must have a value that is a subset (subset is the operator) of the phase attribute of the electrical line to which it is connected. For example, the rule would be satisfied if the conductor being added were of phase A and the electrical line were of phase ABC, but would not be satisfied if the conductor were of phase A and the electrical line of phase BC.

An attribute constraint rule indicates at least one allowed value for an attribute. An attribute may be used, for example, to express that only underground lines can connect to switch cabinets. To satisfy an attribute constraint value rule, the new value must be in the range of valid values expressed in the attribute constraint rule.

In FIG. 13, if a business rule exists, step 1340 determines whether performing the action on the feature will satisfy the business rule.

Figure 14:
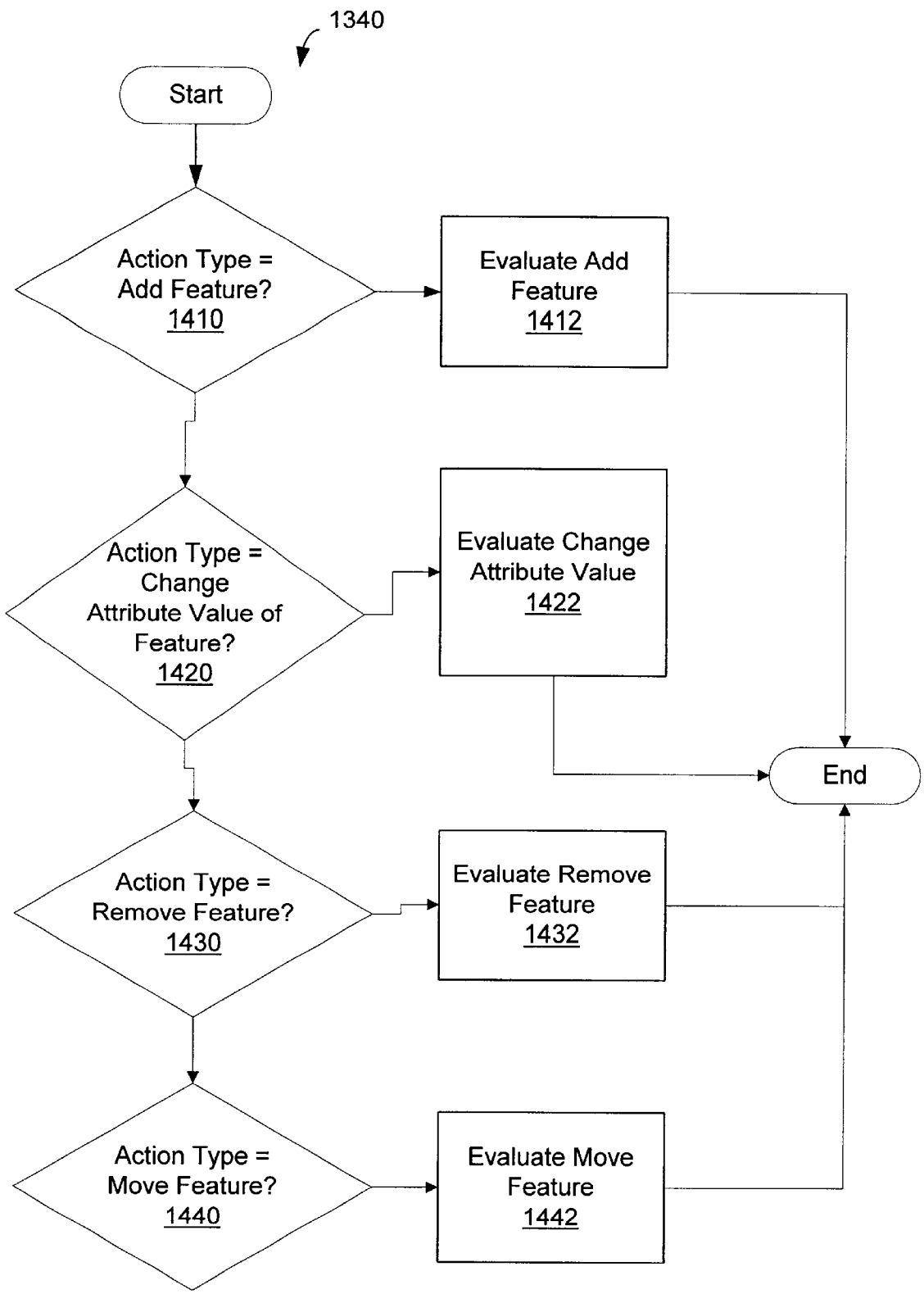
FIG. 14 shows a flowchart for determining whether a business rule is satisfied according to the type of action to be evaluated.

FIG. 14 shows that business rules core 320 has different instructions for implementing determining whether a business rule is satisfied according to the type of action to be evaluated. For determining whether a business rule for an add feature action is satisfied, step Evaluate Add Feature 1412 is used. For determining whether a business rule for a change attribute value action is satisfied, step Evaluate Change Attribute Value 1422 is used. For determining whether a business rule for a remove feature action is satisfied, step Evaluate Remove Feature 1432 is used. For determining whether a business rule for a move feature action is satisfied, step Evaluate Move Feature 1442 is used.

Figure 15:
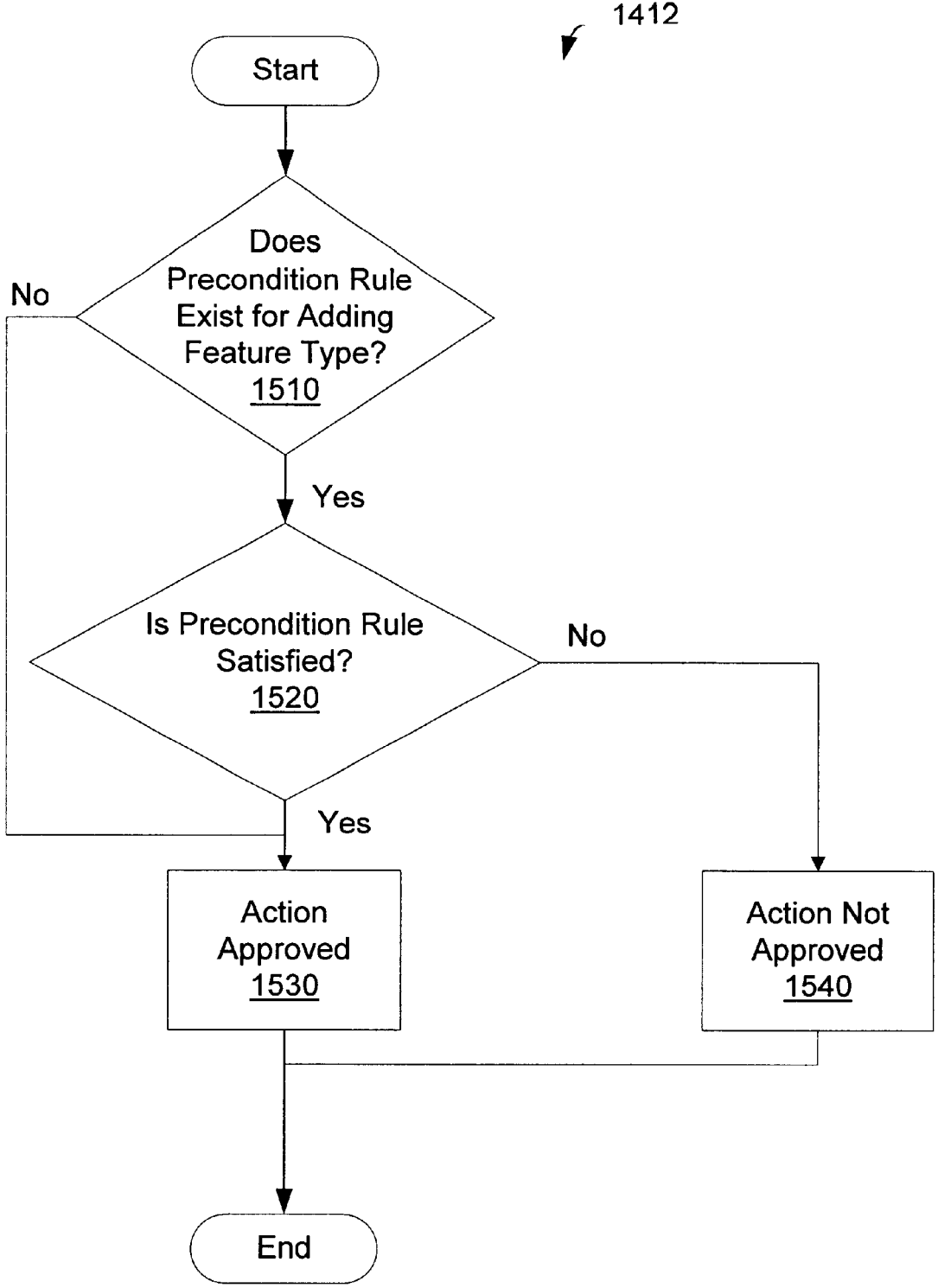
FIG. 15 shows a flowchart of the Evaluate Add Feature of FIG. 14.

FIG. 15 shows the details of step Evaluate Add Feature 1412. For adding a feature, business rules core 320 determines in step 1510 whether a business rule specifies a precondition for adding a feature of this feature type. Normally, a precondition rule will be a feature relationship rule for the feature type, so that a feature cannot be added to a design unless another feature of a given feature type is already present. For example, a transformer could not be added to a work location if a pole were not at the work location to support it. Nor could a transformer be added unless a primary electrical line were also at the work location. A precondition rule may, however, also be another type of rule such as an attribute relationship rule. For example, a secondary electrical line of phase A could not be added if the primary electrical line to which it connects is of phase B. A precondition rule may also require that one or more business rules be satisfied to satisfy the precondition rule.

If in step 1510, a precondition rule does not exist, the action is approved in step 1530. If a precondition rule exists, in step 1520 business rules core 320 determines whether the precondition rule is satisfied by the design. If the precondition rule is satisfied, adding the feature is approved in step 1530, and if the precondition rule is not satisfied, adding the feature is not approved in step 1540.

Figure 16:
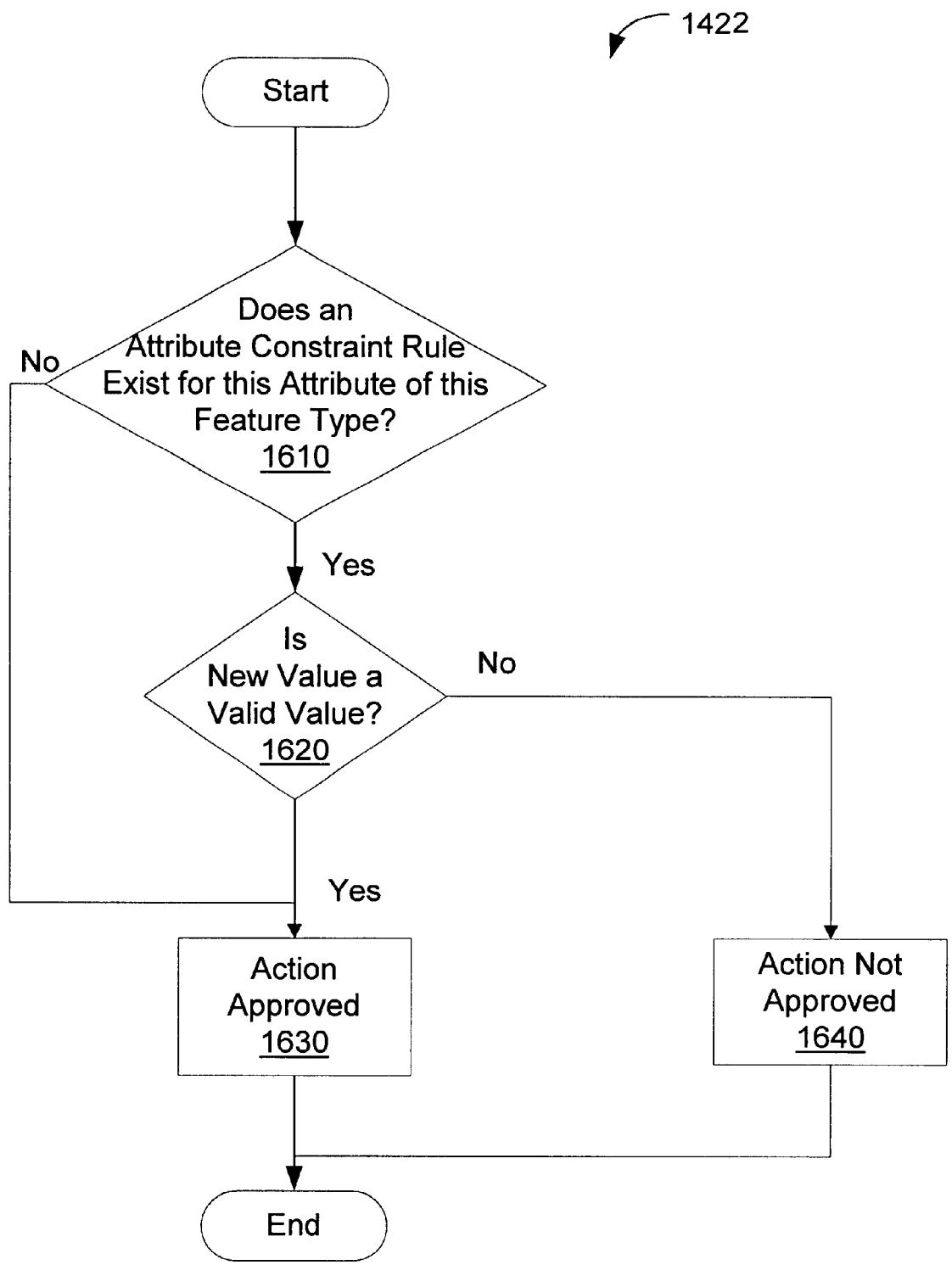
FIG. 16 shows a flowchart of the Evaluate Change Attribute Value step of FIG. 14.

FIG. 16 shows the details of step Evaluate Change Attribute Value 1422. For adding a feature, business rules core 320 determines in step 1610 whether an attribute constraint business rule exists for this attribute of this feature type. If in step 1610, an attribute constraint rule does not exist, the action is approved in step 1630. If an attribute constraint rule exists, in step 1620 business rules core 320 determines whether the new value is a valid value. If the new value is valid, changing the attribute value is approved in step 1630, and if the new value is not valid, changing the attribute value is not approved in step 1640.

Figure 17:
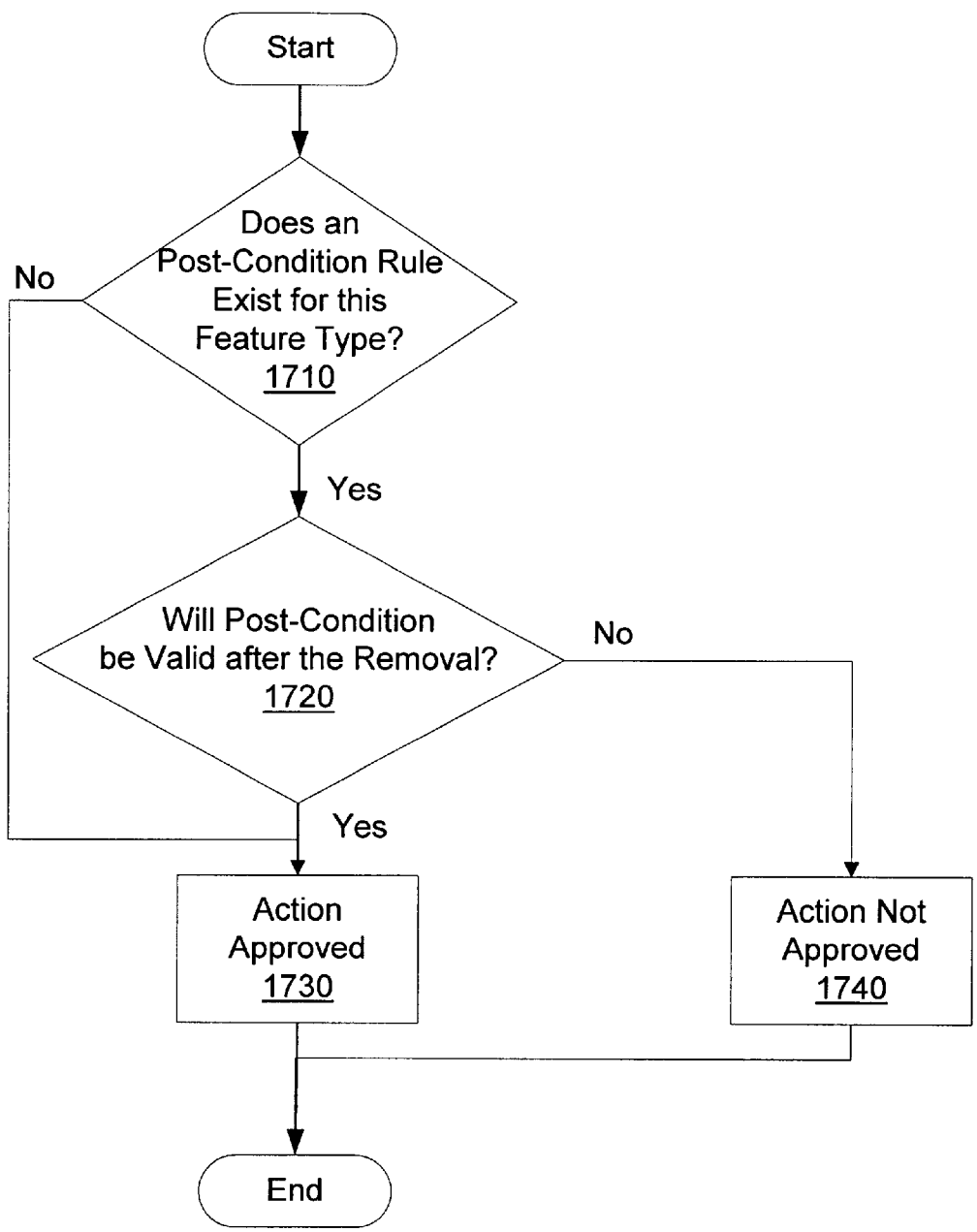
FIG. 17 shows a flowchart of the Evaluate Remove Feature step of FIG. 14.

FIG. 17 shows the details of step Evaluate Remove Feature 1432. For removing a feature, business rules core 320 determines in step 1710 whether a business rule specifies a post-condition for removing a feature of this feature type. Normally, a post-condition rule will be a feature relationship rule for the feature type, so that a feature cannot be removed from a design unless another feature of a given feature type is already present. For example, a pole could not be removed from a work location if a transformer were attached to it. A post-condition rule is satisfied in the same manner as a precondition rule.

If in step 1710, a post-condition rule does not exist, the action is approved in step 1730. If a post-condition rule exists, in step 1720 business rules core 320 determines whether the post-condition rule will be satisfied after the removal. If the post-condition rule is satisfied, removing the feature is approved in step 1730, and if the post-condition rule is not satisfied, removing the feature is not approved in step 1740.

Figure 18:
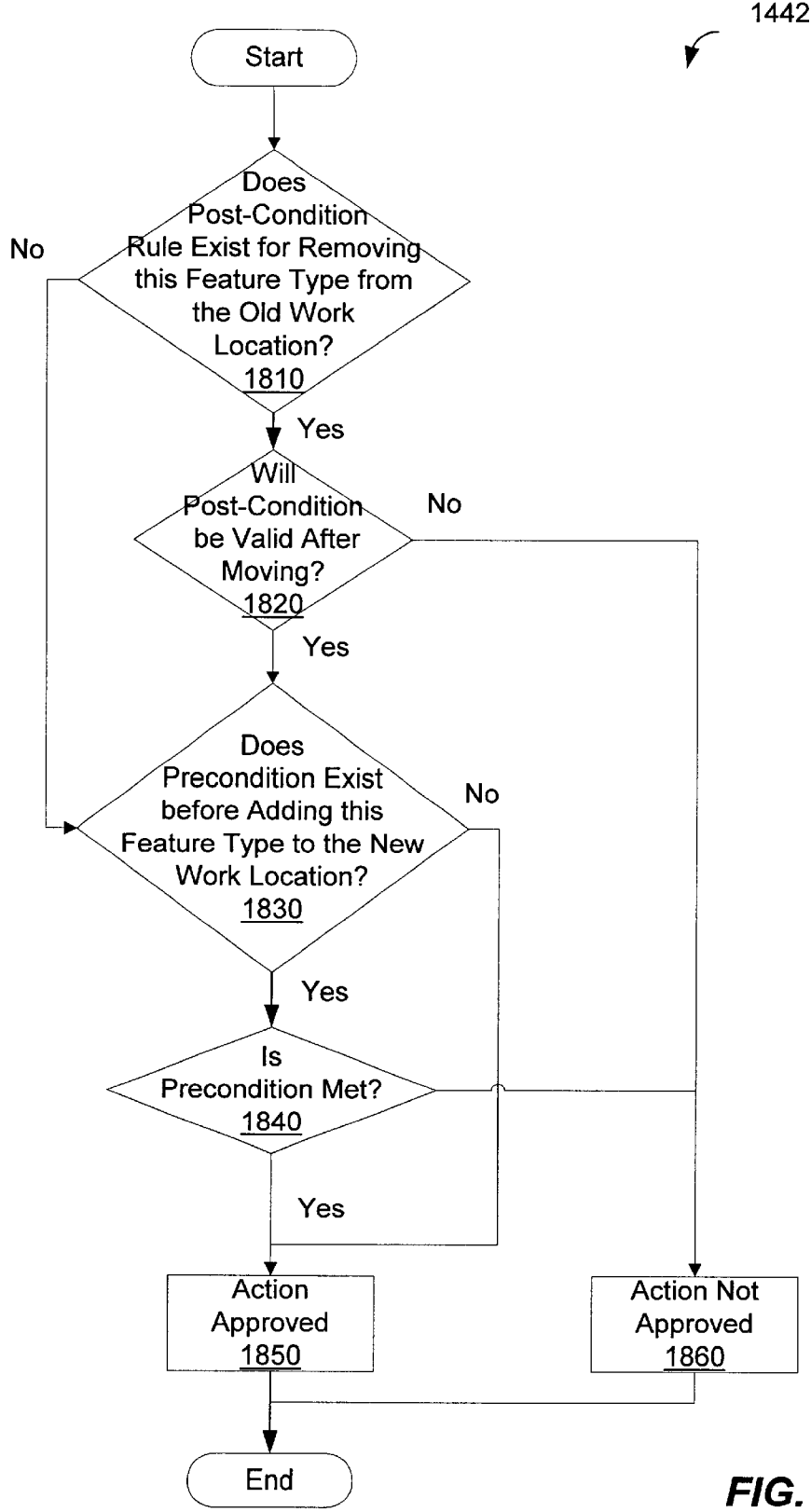
FIG. 18 shows a flowchart of the Evaluate Move Feature step of FIG. 14.

FIG. 18 shows the details of step Evaluate Move Feature 1442. For moving a feature, business rules core 320 determines in step 1810 whether a business rule specifies a post-condition for removing a feature of this feature type from the old work location. If a post-condition rule exists, in step 1820 business rules core 320 determines whether the post-condition rule will be satisfied after the removal. If a post-condition rule does not exist, business rules core 320 proceeds to step 1830.

In step 1830, business rule core then determines whether a business rule specifies a precondition for adding a feature of this feature type to the new work location. If in step 1830, a precondition rule does not exist, the action is approved in step 1850. If a precondition rule exists, in step 1840 business rules core 320 determines whether the precondition rule is satisfied by the design. If the precondition rule is satisfied, adding the feature is approved in step 1850, and if the precondition rule is not satisfied, adding the feature is not approved in step 1860.

Figure 19:
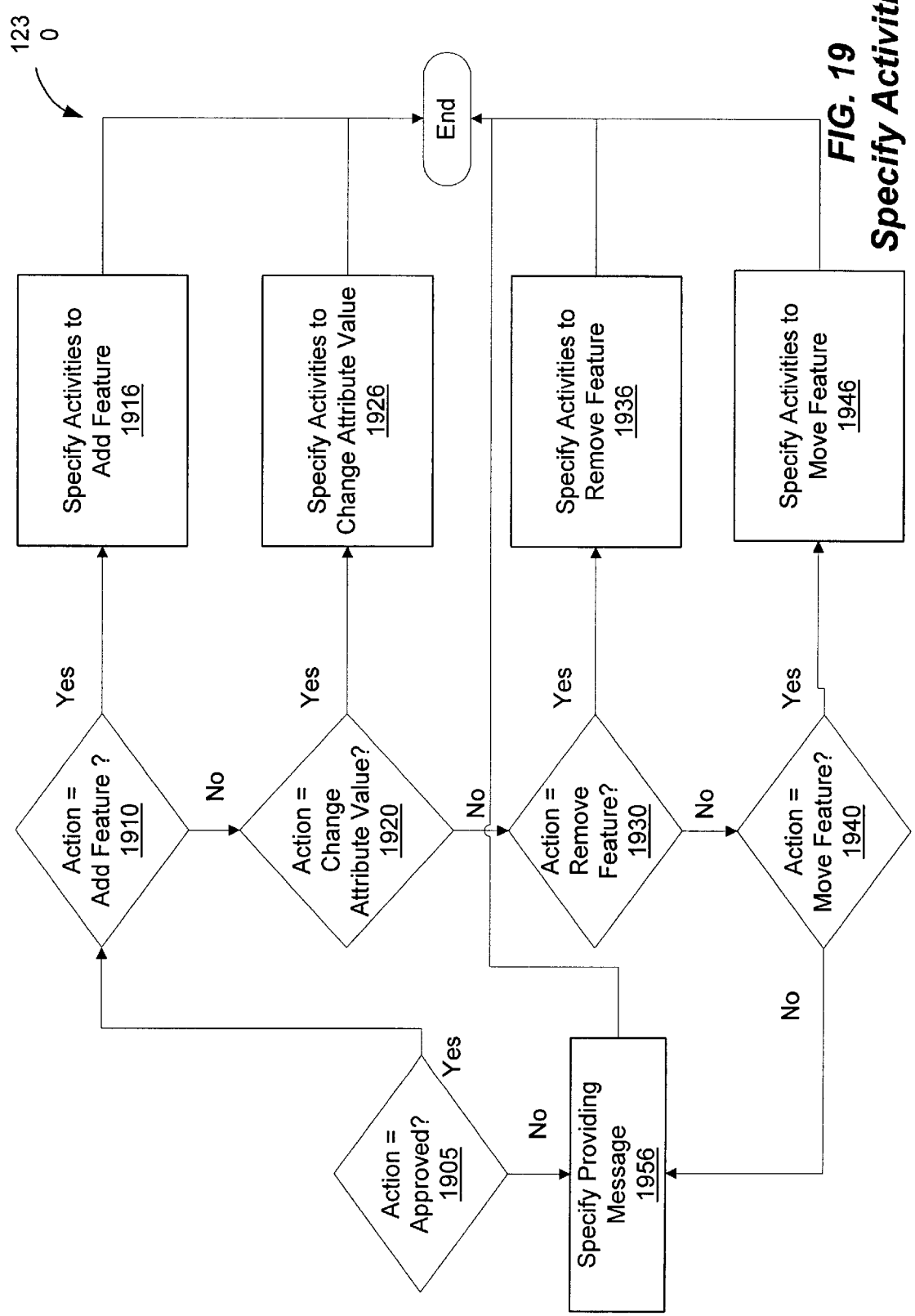
FIG. 19 shows a flowchart for the Specify Activities to be Performed in Response to Request step of FIG. 12.

FIG. 19 shows a detailed flowchart for Specify Activities to be Performed in Response to Request step 1230 of FIG. 12. In step 1905, business rules core 320 determines whether the action was approved. If the action was not approved, in step 1956, business rules core specifies providing an error message to the designer indicating why the action was not approved. If the action was approved, steps 1910, 1920, 1930 and 1940 determine the type of action.

FIG. 19 shows that business rules core 320 has different instructions for implementing specifying activities according to the type of action being implemented. For specifying an add feature action, step Specify Activities to Add Feature 1916 is used. For specifying a change attribute value action, step Specify Activities to Change Attribute Value 1926 is used. For specifying a remove feature action, step Specify Activities to Remove Feature 1936 is used. For specifying a move feature action, step Specify Activities to Move Feature 1946 is used.

Figure 20:
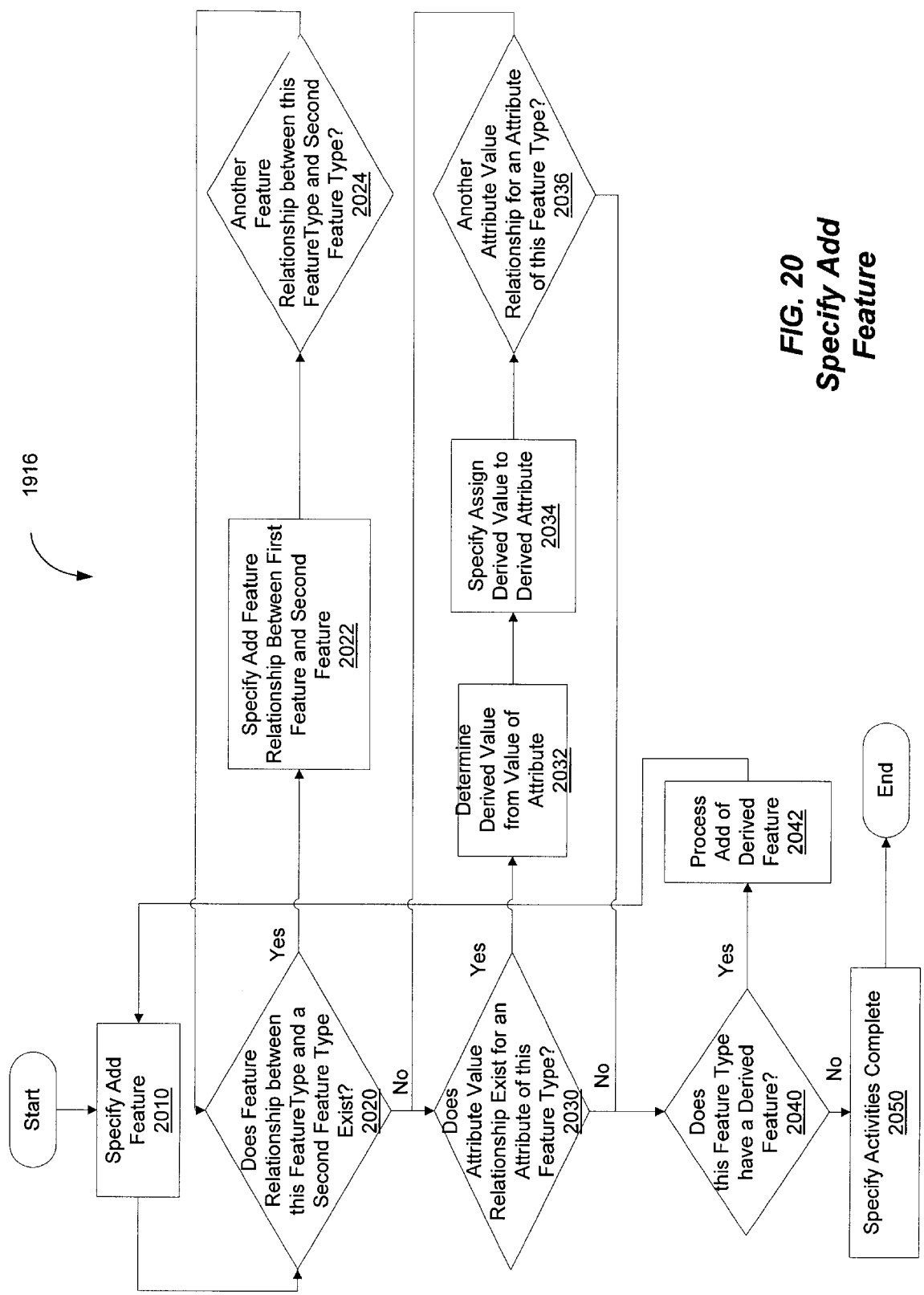
FIG. 20 is a flowchart of the step Specify Activities to Add Feature of FIG. 19.

FIG. 20 is a flowchart of the step Specify Activities to Add Feature 1916. In step 2010, business rules core 320 specifies to add the feature. In step 2020, business rules core 320 determines whether a feature relationship exists between this feature type and a second feature type. If a feature relationship does not exist, business rules core 320 proceeds to step 2030. If a feature relationship exists, in step 2022, business rules core 320 specifies to add the feature relationship between the first feature (the feature being added) and a second feature. In step 2024, business rules core 320 determines whether another feature relationship exists between the feature type of the feature being added and a second feature type. If another feature relationship exists, business rules core 320 returns to step 2020. If another feature relationship does not exist, business rules core 320 proceeds to step 2030.

In step 2030, business rules core 320 determines whether an attribute value relationship exists for this feature type. If an attribute value relationship does not exist, business rules core 320 proceeds to step 2040. If an attribute value relationship exists, in step 2032, business rules core 320 determines a derived value from the value of the determining attribute. In step 2034, business rule core 320 specifies to assign the derived value to the derived attribute. In step 2036, business rules core 320 determines whether another attribute value relationship exists for an attribute of this feature type. If another feature relationship exists, business rules core 320 returns to step 2030. If another feature relationship does not exist, business rules core 320 proceeds to step 2040.

In step 2040, business rules core 320 determines whether this feature type has a derived feature. A derived feature is another feature that is a component, or child, of the parent feature. For example, a derived feature might be a tee fitting for a three-way connection of gas lines.

If a derived feature exists, business rules core processes the addition of the derived feature in step 2042 by returning to repeat steps 2020 and 2030 for the derived feature. If a derived feature does not exist, business rules core 320 continues to step Specifying Activities Complete 2050.

Figure 21:
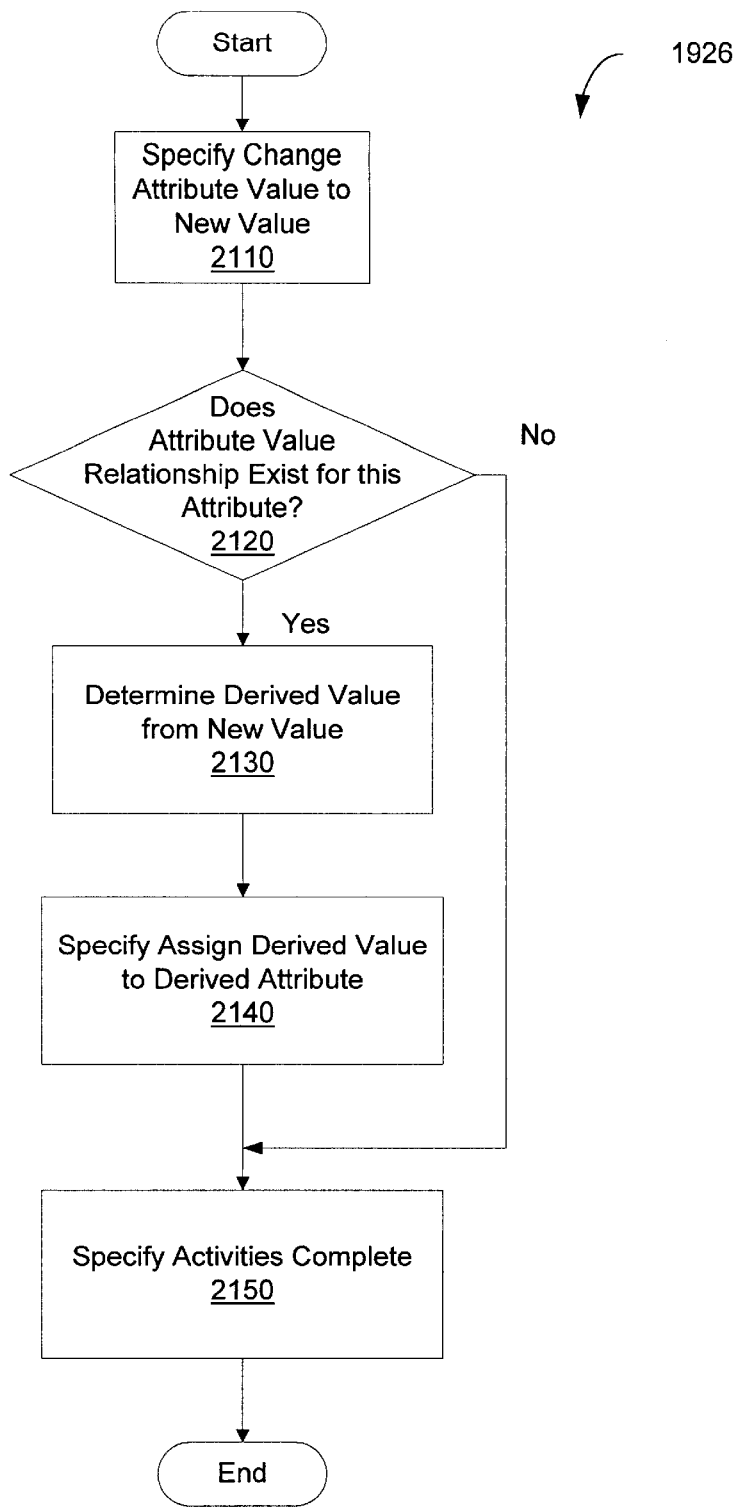
FIG. 21 is a flowchart of the step Specify Activities to Change Attribute Value of FIG. 19.

FIG. 21 is a flowchart of the step Specify Activities to Change Attribute Value 1926. In step 2110, business rules core 320 specifies to change the value of the attribute to the new value. In step 2120, business rules core 320 determines whether an attribute value relationship exists for this attribute. If an attribute value relationship does not exist, business rules core 320 proceeds to step Specifying Activities Complete 2150. If an attribute value relationship exists, in step 2130, business rules core 2120 determines a derived value from the new value. In step 2140, business rule core 320 specifies to assign the derived value to the derived attribute. Business rules core 320 then proceeds to step Specifying Activities Complete 2150.

Figure 22:
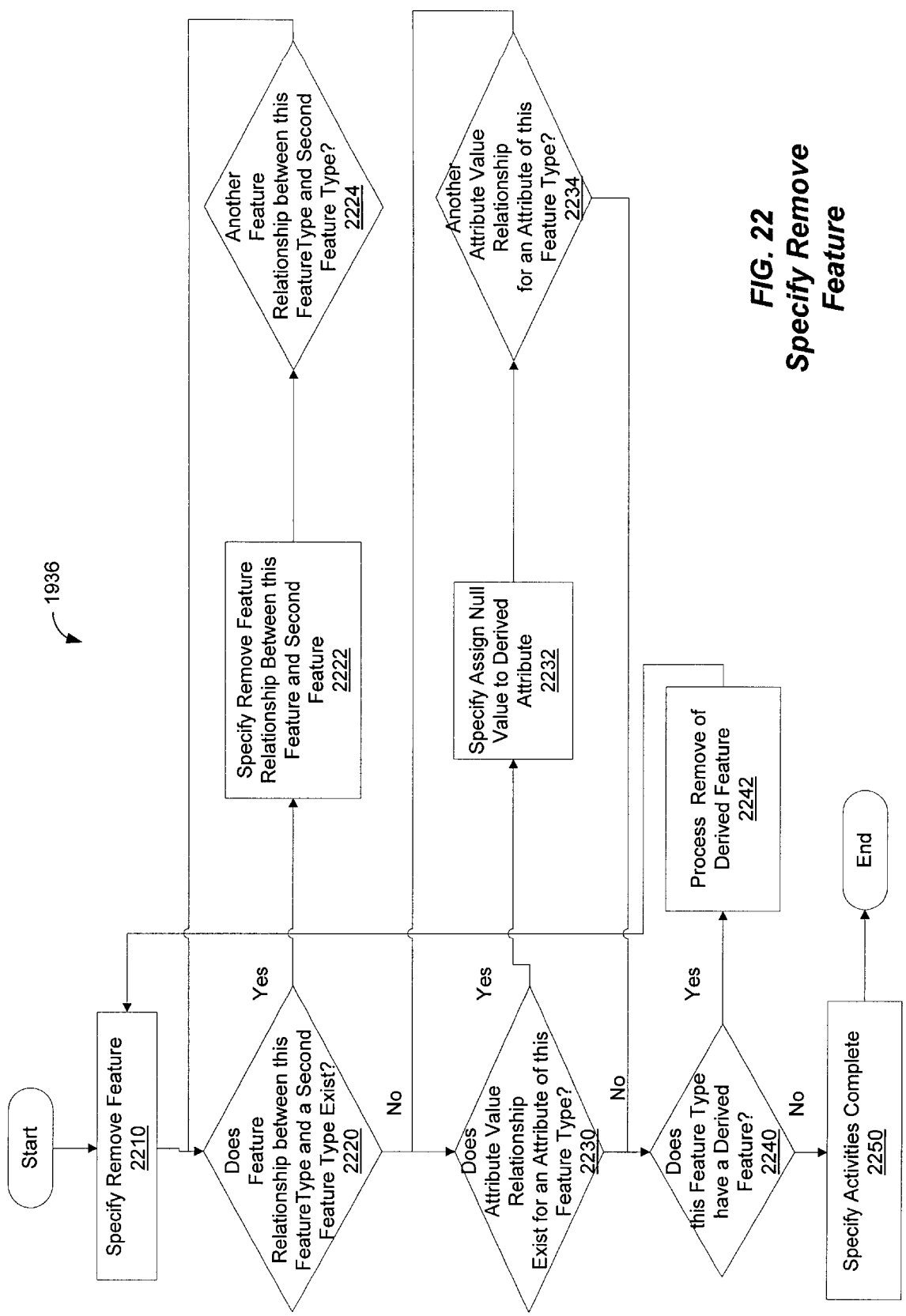
FIG. 22 is a flowchart of the step Specify Activities to Remove Feature of FIG. 19.

FIG. 22 is a flowchart of the step Specify Activities to Remove Feature 1936. In step 2210, business rules core 320 specifies to remove the feature. In step 2220, business rules core 320 determines whether a feature relationship exists between this feature type and a second feature type. If a feature relationship does not exist, business rules core 320 proceeds to step 2230. If a feature relationship exists, in step 2222, business rules core 320 specifies to remove the feature relationship between the first feature (the feature being removed) and the second feature. In step 2224, business rules core 320 determines whether another feature relationship exists between the feature type of the feature being removed and a second feature type. If another feature relationship exists, business rules core 320 returns to step 2220. If another feature relationship does not exist, business rules core 320 proceeds to step 2230.

In step 2230, business rules core 320 determines whether an attribute value relationship exists for this feature type. If an attribute value relationship does not exist, business rules core 320 proceeds to step 2240. If an attribute value relationship exists, in step 2232, business rules core 320 specifies to assign a null value to the derived attribute. In step 2234, business rules core 320 determines whether another attribute value relationship exists for an attribute of this feature type. If another feature relationship exists, business rules core 320 returns to step 2230. If another feature relationship does not exist, business rules core 320 proceeds to step 2240.

In step 2240, business rules core 320 determines whether this feature type has a derived feature. If a derived feature exists, business rules core processes the removal of the derived feature in step 2242 by returning to repeat steps 2220 and 2230 for the derived feature. If a derived feature does not exist, business rules core 320 continues to step Specifying Activities Complete 2250.

Figure 23:
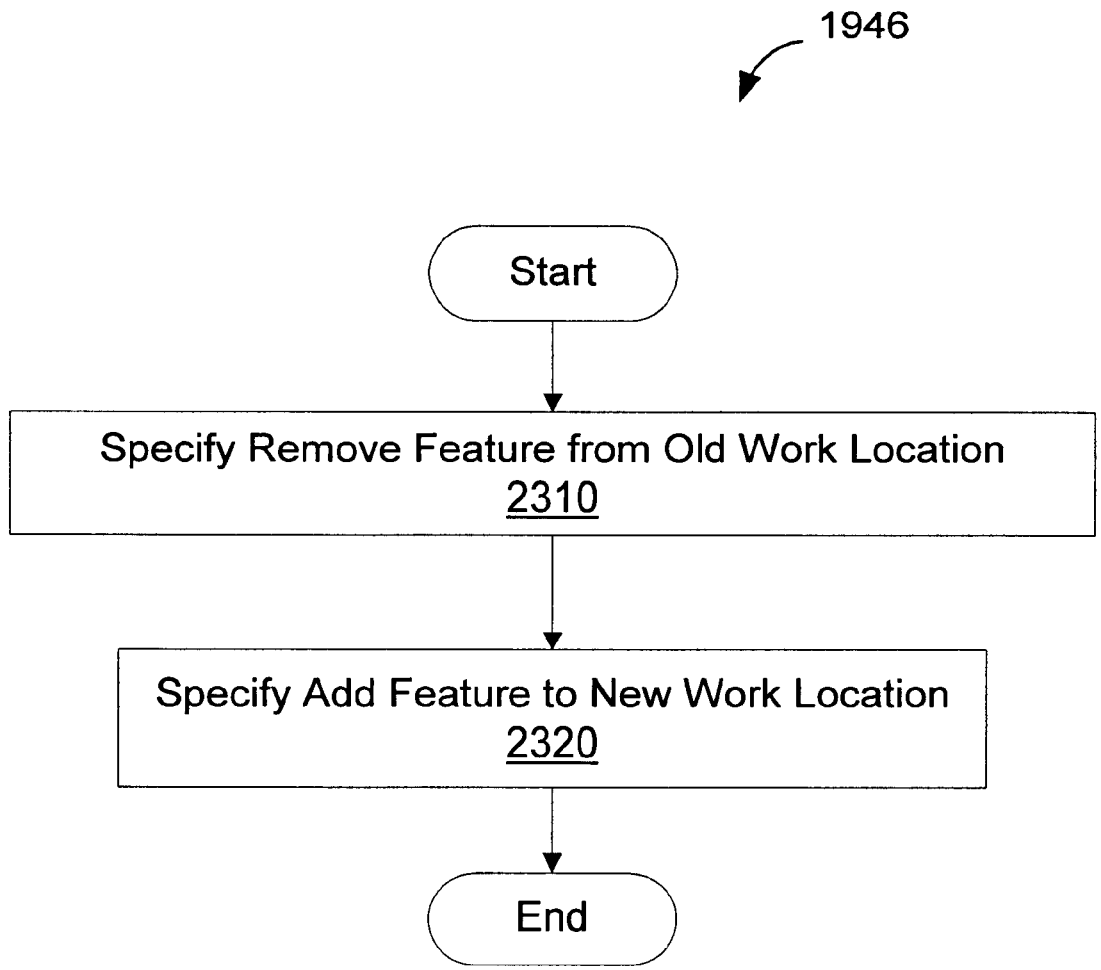
FIG. 23 is a flowchart of the step Specify Activities to Move Feature of FIG. 19.

FIG. 23 is a flowchart of the step Specify Activities to Move Feature 1946. An action of moving a feature from an old work location to a new work location when the action is approved includes specifying removing the feature from the old work location in step 2310. In implementing step 2310, the steps of FIG. 22 are followed for removing the feature from the old work location. In step 2320, business rules core 320 specifies to add the feature to the new work location. In implementing step 2320, the steps of FIG. 20 are followed for adding the feature to the new work location.

Figure 24:
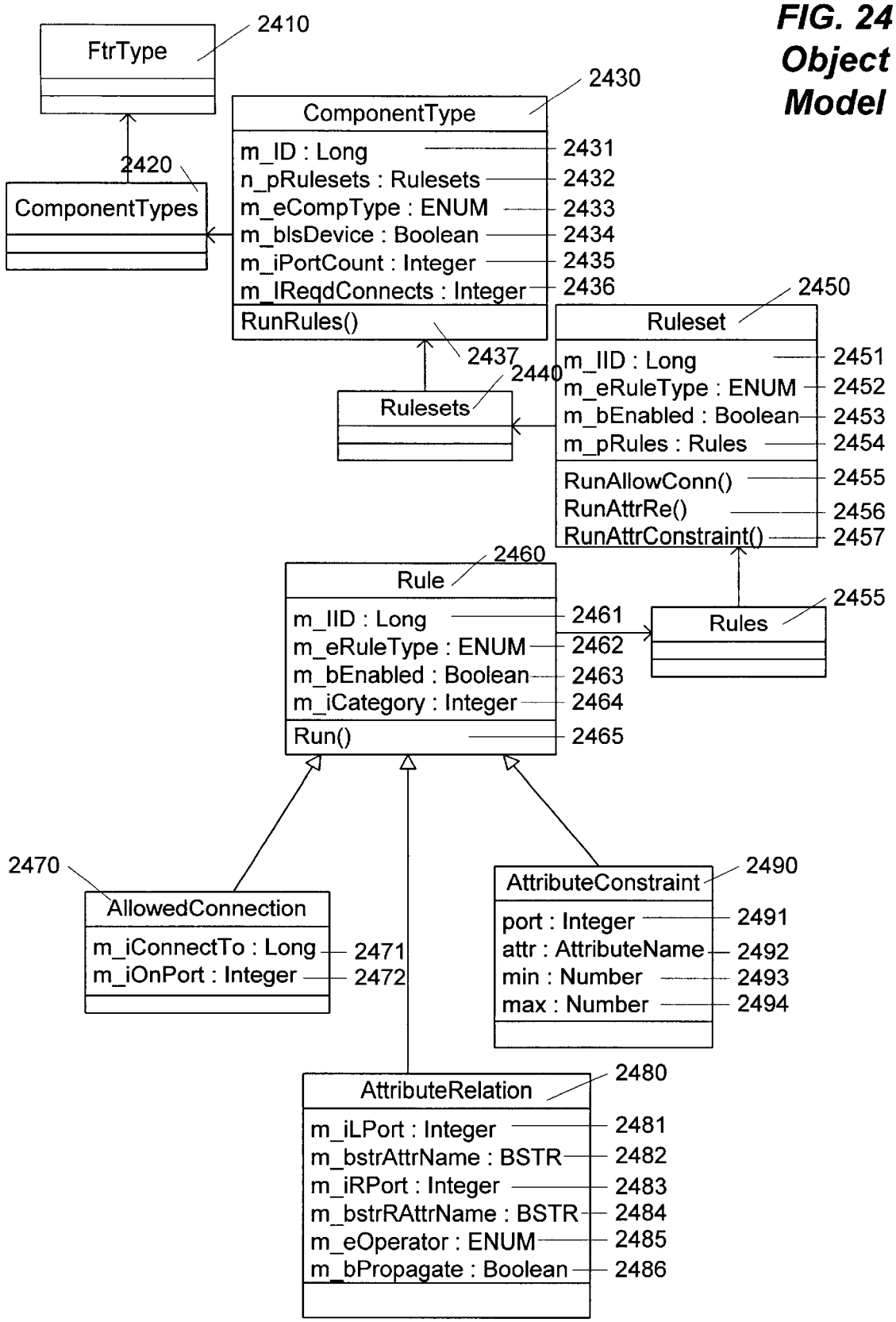
FIG. 24 shows an example of an object model for one embodiment of the business rules module of FIG. 3.

FIG. 24 is an object model of one embodiment implementing the business rules module of the present invention. Feature Type class 2410 represents the feature type of the metamodel. Every feature in the design has a feature type, and each feature type within the model is an instance of class 2410. For instance, class 2410 includes a pole instance which describes the attributes of a pole feature, a transformer instance which describes the attributes of a transformer feature, and so on.

In this embodiment, a feature is comprised of components. A component is either a device component or a continuous component. (For gas and electrical components, device components are geographic points and continuous components are geographic spans.) In this embodiment, when a feature is placed, the expert designer system core 212 provides the intelligence to place the components comprising the feature.

In this embodiment, each feature is aware of its port count 2435. A port is a conceptual representation of a connection point between components of features. A port number is used to indicate an attribute of a component attached to a device.

Port numbers are constant with one of the following values:

0=Self (i.e. the business rule will apply to the feature being placed.)

1=Feature being connected to.

2=Feature already connected to.

Devices connect to other components at a fixed number of distinguished ports. Continuous components support arbitrary, undistinguished connections. Reserved port numbers indicates an attribute of the device itself, or an attribute of any connecting component.

Component types are used to distinguish multiple aspects of a real-world object represented as a feature. For example, in this embodiment, business rules distinguish the physical and electrical characteristics of the same feature. A transformer—as a physical device—is connected to a pole, but a transformer—as an electrical device—is connected to two electrical lines. The separate representation of physical and electrical characteristics as component types allows the separate expression of the physical, electrical, and gas connectivity business rules. The component type abstraction is one way to classify business rules into different types, although many other alternatives for classifying business rules are within the scope of the present invention.

Component Types class 2420 is used to classify business rules into different types. Component type class 2430 is an abstraction of feature relationships. As mentioned earlier, in an electrical design, a feature type may have a structural relationship to another feature type, such as a transformer may be structurally attached to a pole. Also in the electrical field are flow connectivity relationships. For example, a transformer can make two flow connections, one to a primary electrical line and another to a secondary electrical line. Component type class 2430 allows for the expression of the structural attachment type of feature relationship and the flow connectivity type of feature relationship.

Each component type is described by an instance of ComponentType. A component type has an ID 2431, a rulesets pointer 2432 to rulesets 2440 for the component type, the component type 2433, a device indicator 2434, a port count 2435, and a minimum number of connections indicator 2436. A RunRules method 2437 is used for each component type.

Rules are grouped together in Rulesets. In this embodiment, a Ruleset is satisfied if any one of its constituent rules is satisfied. In this embodiment, a feature type may only be placed if all of the rulesets of its component types are satisfied. In effect, for this embodiment the relationship between rulesets is AND (e.g. A and B must both be satisfied) and the relationship between rules within a ruleset is OR (e.g. either A or B must be satisfied.)

A Ruleset 2450 belongs to Rulesets 2440. A Ruleset 2450 has an ID 2451, a rule type 2452, an enabled flag 2453, a rules pointer 2454 to Rules 2455, a RunAllowedConnections method 2455, a RunAttributeRelationships method 2456, and a RunAttributeConstraints method 2457.

A Rule 2460 belongs to Rules 2455. A rule 2460 has an ID 2461, a rule type 2462, an enabled flag 2463, and a category 2464. A rule 2460 also has a Run method 2465. Business rules may be disabled, for example, to allow placement of any feature at any work location. Each business rule may be enabled or disabled on an individual basis and a ruleset may be enabled or disabled as a whole.

In this embodiment of the invention, business rules are further classified into different types, where each type of business rule requires different representation and treatment. The three types of business rules represented are connectivity rules (a feature relationship rule), attribute constraint rules, and attribute relation (attribute value relationship) rules. Each type of rule is represented as a subclass of rule class 2470.

Three subclasses of the rule class 2470 in this embodiment are AllowedConnection 2470, AttributeRelation 2480, and AttributeConstraint 2490. AllowedConnection 2470 corresponds to the feature relationship rules, AttributeRelation 2480 corresponds to the attribute value relationship rules, and AttributeConstraint 2490 corresponds to the attribute constraint rules previously described.

Allowed Connection rules specify the feature types that may be connected. Each feature type component has a minimum number of required connections, and a feature may only be placed if each of its components can make the minimum number of connections at the target work location. If a feature type has no specified Allowed Connection rules, it will behave as if the minimum number of connections is zero. Allowed Connection rules operate on only one port.

The AllowedConnection class determines which component types may be interconnected, and for devices, at which port. This allows derivation of port number from known connections. An AllowedConnection 2470 business rule has a ConnectTo indicator 2471 and an OnPort indicator 2472.

The AttributeRelation class expresses equality or inequality between two attributes on components connected to a device, or between an attribute of the device and an attribute on a connected component. Attributes may be set valued, and Boolean operations such as set inclusion are used to express rules on set-valued attributes. For example, a business rule may express the fact that the phases of a secondary line from a power transformer are a subset of the phases of the primary line.

An AttributeRelation 2480 rule has an Lport indicator 2481, an AttrName 2482, an Rport 2483, an RattrName 2484, an operator 2485, and a propagate flag 2486. Valid values for operator 2485 include equal, not equal, less than, less than or equal, greater than, greater than or equal, contains (or superset), contained in (or subset).

An AttributeConstraint 2490 rule has a port 2491, an AttributeName 2492, a minimum value 2493, and a maximum value 2494. For example, operating pressures of connected features must be equal.

OTHER EMBODIMENTS

In the embodiment of the invention shown in FIG. 24, all instances of the ComponentType class and its dependent classes are represented in files or database tables that are loaded at startup of the expert designer system 200. This structure supports rule extensibility and customization of component types and rules to specific customers.

The embodiment of FIG. 24 supports only a limited range of expression for rules and is not intended to limit the scope of the invention. For example, in the embodiment of FIG. 24, rules expressing relationships of more than two attributes or showing attributes in complex expression are not shown.

The expert designer system and business rules module of FIG. 2 are based upon a Component Object Model (COM) architecture. The COM architecture is an open architecture which provides the expert designer system and business rules module with independence from specific GIS and work management system (WMS) implementations and specific programming languages. Other embodiments of the expert designer system and business rules module may use other architectures that provide independence similar to that provided by the COM architecture.

The present invention, therefore is well adapted to attain the advantages mentioned as well as others inherent therein. While the present invention has been depicted, described, and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are exemplary only, and are not exhaustive of the scope of the invention. Consequently, the invention is intended to be limited only by the spirit and scope of the appended claims, giving full cognizance to equivalents in all respects.

What is claimed is:

1. An intelligent business rules module for processing a request for an action to be performed on a design comprising:
   at least one business rule; and
   a business rules core comprising:
      receiving instructions for receiving the request;
      evaluating instructions for immediately using a business rule of the at least one business rule for dynamically evaluating the action prior to the performance of the action;
      approving instructions for determining whether the action is approved; and
      specifying instructions for using a business rule of the at least one business rule for specifying at least one activity to be performed in response to the request.

2. The business rules module of claim 1 wherein the action comprises one of a group consisting of the following:
   adding a feature to the design;
   changing a value of an attribute of a feature of the design;
   removing a feature from the design; and
   moving a feature from an old work location in the design to a new work location in the design.

3. The business rules module of claim 2 wherein the action has an action type and the feature has a feature type; and
   the evaluating the action comprises:
      determining the action type;
      determining the feature type;
      determining whether a business rule of the at least one business rule exists for performing the action type on the feature type;
      if a business rule exists, determining whether performing the action on the feature will satisfy the business rule, and if performing the action will satisfy the business rule, approving the action, and if performing the action will not satisfy the business rule, not approving the action.

4. The business rules module of claim 3 wherein
   if a business rule does not exist, not approving the action.

5. The business rules module of claim 3 wherein
   if a business rule does not exist, approving the action.

6. The business rules module of claim 3 wherein a business rule of the at least one business rule comprises one of a group consisting of the following:
   a feature relationship rule indicating a relationship between a first feature type and a second feature type; and
   an attribute value relationship rule indicating a relationship between a value of a first attribute to a value of a second attribute;
   an attribute constraint rule indicating at least one allowed value for an attribute.

7. The business rules module of claim 6 wherein the specifying the at least one activity for an action of adding a feature includes:
   when the action is approved,
   specifying adding the feature, the feature being a first feature, the first feature having a first feature type;
   determining whether a feature relationship exists between the first feature type and a second feature type and, when a feature relationship exists, specifying adding a feature relationship between the first feature and a second feature;

determining whether an attribute value relationship exists between an attribute of the first feature type and a second attribute, and when an attribute value relationship exists, determining a derived value from the value of the attribute of the first feature and specifying assigning the derived value to the second attribute; and determining whether a derived feature exists for the first feature type, and when a derived feature exists, specifying adding the derived feature;

and when the action is not approved, specifying providing a message that the feature cannot be added.

8. The business rules module of claim 6 wherein the specifying the at least one activity for an action of changing the value of an attribute of a feature includes:

when the action is approved, specifying changing the value of the attribute of the feature to the new value, the feature being a first feature; and determining whether an attribute value relationship exists between an attribute of the first feature type and a second attribute, and when an attribute value relationship exists, determining a derived value from the value of the attribute of the first feature and specifying assigning the derived value to the second attribute;

and when the action is not approved, specifying providing a message that the change cannot be made.

9. The business rules module of claim 6 wherein the specifying the at least one activity for an action of removing a feature includes:

when the action is approved, specifying removing the feature from the design, the feature being a first feature;

determining whether a feature relationship exists between the first feature type and a second feature type and, when a feature relationship exists, specifying removing a feature relationship between the first feature and the second feature;

determining whether an attribute value relationship exists between an attribute of the first feature type and a second attribute, and when an attribute value relationship exists, specifying assigning a null value to the second attribute; and determining whether a derived feature exists for the first feature type, and when a derived feature exists, specifying removing the derived feature;

and when the action is not approved, specifying providing a message that the removal is not approved.

10. The business rules module of claim 6 wherein the specifying the at least one activity for an action of moving a feature from an old work location to a new work location when the action is approved includes:

specifying removing the feature from the old work location, the feature being a first feature;

specifying adding the first feature to the new work location;

determining whether a feature relationship exists between the first feature type and a second feature type and, when a feature relationship exists, specifying removing a feature relationship between the first feature and the second feature at the old work location and specifying adding a feature relationship between the first feature and a third feature at the new work location;

determining whether an attribute value relationship exists between an attribute of the first feature type and a second attribute of the second feature, and when an attribute value relationship exists, specifying assigning a null value to the second attribute, determining a derived value from the value of the attribute of the first feature, and specifying assigning the value of the attribute of the first feature to the attribute of the third feature; and determining whether a derived feature exists for the first feature type, and when a derived feature exists, specifying removing the derived feature from the old work location and adding the derived feature to the new work location;

and when the action is not approved, specifying providing a message that the feature cannot be moved.

11. The business rules module of claim 3 wherein a business rule of the at least one business rule comprises one of a group consisting of the following:

a structural rule; and a flow connectivity rule.

12. The business rules module of claim 11 wherein a plurality of business rules comprise a ruleset, the ruleset having an enabled flag indicating whether the ruleset is active;

the determining whether a business rule of the at least one business rule exists includes determining whether the business rule is part of the ruleset and determining whether the ruleset is active and, if the business rule is part of the ruleset and the ruleset is active, determining that a business rule exists, and if and if the business rule is part of a ruleset and the ruleset is not active, determining that a business rule does not exist.

13. The business rules module of claim 3 wherein a business rule has an enabled flag indicating whether the business rule is active;

the determining whether a business rule of the at least one business rule exists for performing the action type on the feature type includes using the enabled flag for determining whether the business rule is active, and if the business rule is active, determining that a business rule exists, and if the business rule is not active, determining that a business rule does not exist.

14. The business rules module of claim 1 wherein the business rule core selecting a business rule to evaluate the action includes selecting a plurality of business rules to evaluate the action; and when the action is approved by each of the plurality of business rules, the action is approved; and when the action is not approved by one of the plurality of business rules, the action is not approved.

15. The business rules module of claim 1 wherein the design is represented as a data model;

the at least one business rule describes a quality standard for a metamodel independently of the data model; and the business rules core operates using the metamodel independently of the data model.

16. An expert designer system for processing a request for an action on a design comprising:
a design module comprising:
specification instructions for specifying a request for the action on the design; and
performing instructions for performing an activity on the design;
at least one business rule; and
a business rules core comprising:
receiving instructions for receiving the request;
evaluating instructions for immediately using a business rule of the at least one business rule for dynamically evaluating the action prior to the performance of the action;
approving instructions for determining whether the action is approved; and
specifying instructions for using a business rule of the at least one business rule for specifying at least one activity to be performed in response to the request; and wherein
the design module uses the business rules module for evaluating the action, and when the action is approved, the performing instructions perform the at least one activity on the design.

17. The expert designer system of claim 16 wherein
the database system includes a native GIS, the native GIS conforming to one of a plurality of GIS types, and the virtual plug-in interface includes a virtual GIS plug-in interface, the virtual GIS plug-in interface communicating with the expert designer system core and the virtual GIS plug-in interface communicating with the native GIS, wherein the expert designer system core functions independently of the GIS type.

18. The expert designer system of claim 16, wherein
the database system includes a native work management system, the native work management system conforming to one of a plurality of work management system types, and the virtual plug-in interface includes a virtual work management system plug-in interface, the virtual work management system plug-in interface communicating with the expert designer system core and the virtual work management system plug-in interface communicating with the native work management system, wherein the expert designer system core functions independently of the work management system type.

19. A method for processing a request for an action on a design comprising:
receiving the request;
immediately using a business rule for dynamically evaluating the action prior to the performance of the action;
determining whether the action is approved;
using a business rule for specifying at least one activity to be performed in response to the request; and
performing the at least one activity.

20. An expert designer system for use with a plurality of database system types comprising:
an expert designer system core, the expert designer system core including:
a design module comprising;
specification instructions for specifying a request for the action on the design; and
performing instructions for performing an activity on the design;
a business rules module, the business rules module evaluating the design, the
business rules module comprising:
receiving instructions for receiving the request;
selecting instructions for immediately selecting a business rule of the at least one business rule for evaluating the action;
approving instructions for determining whether the action is approved; and
specifying instructions for using the business rule for specifying at least one activity to be performed on the design in response to the evaluating the action;
a database system, the database system conforming to at least one of the plurality of database system types; and
a virtual plug-in interface, the virtual plug-in interface communicating with the expert designer system core and the virtual plug-in interface communicating with the database system, wherein the expert designer system core functions independently of the database type; and wherein
the design module uses the business rules module for evaluating the action and, when the action is approved, the performing instructions perform the at least one activity on the design.

21. A computer system comprising:
a processor; and
a memory, the memory including a business rules module for evaluating a design, the business rules module comprising:
at least one business rule; and
a business rules core comprising:
receiving instructions for receiving the request;
evaluating instructions for immediately using a business rule of the at least one business rule for dynamically evaluating the action prior to the performance of the action;
approving instructions for determining whether the action is approved; and
specifying instructions for using a business rule of the at least one business rule for specifying at least one activity to be performed in response to the request.

* * * * *